US012725898B2

(12) United States Patent
Tantawi et al.

(10) Patent No.: US 12,725,898 B2
(45) Date of Patent: Sep. 1, 2026

(54) COMPACT HIGH POWER RADIO FREQUENCY POLARIZER GROUP

(71) Applicant: TibaRay Inc., Santa Clara, CA (US)

(72) Inventors: Sami Tantawi, Stanford, CA (US); Glenn Scheitrum, San Mateo, CA (US); Vahid Miraftab, Sunnyvale, CA (US); Luyao Xu, Santa Clara, CA (US)

(73) Assignee: TibaRay, Inc., Santa Clara, CA (US)

( * ) Notice: Subject to any disclaimer, the term of this patent is extended or adjusted under 35 U.S.C. 154(b) by 516 days.

(21) Appl. No.: 18/109,155

(22) Filed: Feb. 13, 2023

(65) Prior Publication Data

US 2023/0335878 A1 Oct. 19, 2023

Related U.S. Application Data

(60) Provisional application No. 63/330,678, filed on Apr. 13, 2022.

(51) Int. Cl.
*H01P 3/123* (2006.01)
*H01P 1/213* (2006.01)
(Continued)

(52) U.S. Cl.
CPC ............ *H01P 3/123* (2013.01); *H01P 1/2131* (2013.01); *H01P 5/082* (2013.01); *H01P 5/12* (2013.01)

(58) Field of Classification Search
CPC .. H01P 5/082; H01P 3/123; H01P 5/12; H01P 1/2131
(Continued)

(56) References Cited

U.S. PATENT DOCUMENTS 2,867,772 A 1/1959 Allen
9,386,682 B2 7/2016 Tantawi et al.
(Continued)

FOREIGN PATENT DOCUMENTS

CN 103515677 A * 1/2014
CN 106998217 B 5/2019
EP 3832791 A1 6/2021

OTHER PUBLICATIONS

Cattelino et al., "Fast-and Super-Fast-Warm-up Cathodes Using Novel APG/APBN Heaters", IEEE Transactions on Electron Devices, vol. 38, No. 10, Oct. 1991, pp. 2239-2243.
(Continued)

*Primary Examiner* — Rakesh B Patel
(74) *Attorney, Agent, or Firm* — Kilpatrick Townsend & Stockton LLP

(57) ABSTRACT

Waveguide devices, associated components and methods. Waveguide devices can include a rectangular waveguide having first and second rectangular ports at one end, and first and second circular waveguides extending from opposing broad sides of the waveguide to provide either full isolation or full transmission between first and second ports. The waveguide can include a fixed short at one circular waveguides and a short with adjustable biasing structure at the other circular waveguide to accommodate broader ranges of high-power capabilities. The waveguide device can be stacked by connecting circular waveguides of adjacent structures to provide an isolator with additional ports or an adjustable directional coupler. The adjustable shorting structure can include plunger or screw-type threads. The waveguide can include a rectangular waveguide in a four-port network with a circular waveguide extending to a fifth port supporting two modes of operation, and can be shorted with a contoured disc of non-reciprocal material.

29 Claims, 19 Drawing Sheets
(19 of 19 Drawing Sheet(s) Filed in Color)

(51) Int. Cl.
*H01P 5/08* (2006.01)
*H01P 5/12* (2006.01)

(58) Field of Classification Search
USPC ............ 333/24 R, 24.1, 24.2, 24.3, 206–209
See application file for complete search history.

(56) References Cited

U.S. PATENT DOCUMENTS

| | | | |
|---|---|---|---|
| 9,419,322 | B2 | 8/2016 | Tantawi |
| 2002/0130808 | A1 | 9/2002 | Fukushima et al. |
| 2003/0076193 | A1 | 4/2003 | Chen et al. |
| 2005/0057402 | A1 | 3/2005 | Ohno et al. |
| 2006/0006959 | A1 | 1/2006 | Harris |
| 2013/0257563 | A1 | 10/2013 | Chang et al. |
| 2015/0194720 | A1 | 7/2015 | Tantawi |
| 2020/0091577 | A1 | 3/2020 | Angevain et al. |
| 2020/0136220 | A1 | 4/2020 | Ravanelli et al. |

OTHER PUBLICATIONS

Chang et al., "A New Compact High-power Microwave Phase Shifter", IEEE Transactions on Microwave Theory and Techniques, vol. 63, No. 6, Jun. 2015, pp. 1875-1882.
Chang et al., "Novel Compact Waveguide Dual Circular Polarizer", Progress In Electromagnetics Research, vol. 136, Jan. 2013, pp. 1-16.
Chao et al., "Handbook Of Accelerator Physics And Engineering", 3rd printing, World Scientific Publishing Company, Mar. 1999.
Chubar et al., "A 3D Magnetostatics Computer Code for Insertion Devices", Journal of Synchrotron Radiation, vol. 5, May 1, 1998, pp. 481-484.
Dolgashev et al., "Geometric Dependence of Radio-frequency Breakdown in Normal Conducting Accelerating Structures", Applied Physics Letters, vol. 97, No. 17, Oct. 25, 2010, 3 pages.
Elleaume et al., "Computing 3D Magnetic Fields from Insertion Devices", Proceedings of the 1997 Particle Accelerator Conference, May 1997, pp. 3509-3511.
Franzi et al., "Compact Rf Polarizer and Its Application to Pulse Compression Systems", Physical Review Accelerators and Beams, vol. 19, No. 6, Jun. 2016, pp. 062002-1-062002-10.
Gold , "Applications of Lagrangian Field Theory in the Computational Modeling of Beam-wave Interactions", Stanford University, Aug. 2019, pp. 1-24.
Karzmark et al., "Medical Electron Accelerators", Chapter 3, McGraw-Hill, Incorporated, Health Professions Division, 1993.
Knapp, "Linear Accelerator Conference", MURA-714, 1964, p. 31.
Knapp et al., "Standing Wave High Energy Linear Accelerator Structures", The Review of scientific instruments, vol. 39, No. 7, Jul. 1968, pp. 979-991.
Laurent et al., "Experimental Study of RF Pulsed Heating", Physical Review Accelerators and Beams, vol. 14, No. 4, Apr. 7, 2011, pp. 041001-1-041001-21.
Leupold et al., "Novel High-field Permanent-magnet Flux Sources", IEEE Transactions on Magnetics, vol. 23, No. 5, Sep. 1987, pp. 3628-3629.
Maxim et al., "PHASER: A Platform for Clinical Translation of FLASH Cancer Radiotherapy", Radiotherapy and Oncology, vol. 139, Oct. 2019, 23 pages.
Nanni et al., "C3 A Cool Copper Collider".
Othman et al., "Solid-State Powered X-Band Accelerator", SLAC National Accelerator Laboratory, Nov. 2016, 22 pages.
Tantawi et al., "Design and Demonstration of a Distributed-coupling Linear Accelerator Structure", Physical Review Accelerators and Beams, vol. 23, No. 9, Sep. 2020, pp. 092001-1-092001-11.
Tantawi, "Multimoded Reflective Delay Lines and Their Application to Resonant Delay Line Rf Pulse Compression Systems", Physical Review Accelerators and Beams, vol. 7, No. 3, Mar. 2004, pp. 032001-1-032001-6.
Wangler, "Rf Linear Accelerators", Wiley, Chapter 4, Jan. 2008.
Collin, "Foundations for Microwave Engineering", Second Edition, Wiley-IEEE Press, 2001, 945 pages.
Montgomery et al., "Principles of Microwave Circuits", Office of Scientific Research and Development National Defense Research Committee, Radiation Laboratory MIT, McGraw-Hill Book Company, 1948, 506 pages.
Pozar, "Microwave Engineering", Fourth Edition, John Wiley & Sonds, Inc., 2012, 756 pages.

* cited by examiner

COMPACT HIGH POWER RADIO FREQUENCY POLARIZER GROUP

CROSS-REFERENCES TO RELATED APPLICATIONS

This application is a Non-Provisional of and claims the benefit of priority to U.S. Provisional Application No. 63/330,678 filed Apr. 13, 2022, which is incorporated herein by reference in its entirety.

STATEMENT AS TO RIGHTS TO INVENTIONS MADE UNDER FEDERALLY SPONSORED RESEARCH AND DEVELOPMENT

This invention was made with government support under Grant DE-SC0017857, awarded by the U.S. Department of Energy. The government has certain rights in the invention.

BACKGROUND OF THE INVENTION

The present invention relates generally to RF waveguide devices, particularly high-power RF waveguide device that are also compact and broadband.

Microwave waveguide polarizers are a wide class of devices that include but are not limited to: couplers, isolators, phase shifters, loads and duplexers. These devices are widely used in particle accelerators, communications and defense technologies. However, most of the existing designs are either lacking high power handling capabilities or huge in total size. One approach to remedy this can be found in U.S. Pat. No. 9,419,322, and is explained in more details in the following reference—Franzi, M., Wang, J., Dolgashev, V. and Tantawi, S., 2016. *Compact rf polarizer and its application to pulse compression systems*. Physical Review Accelerators and Beams, 19(6), p. 062002). There are currently a few different types of polarizer devices. Typically, the coupling rate of waveguide directional coupler is fixed such that it is difficult to achieve a tunable coupling rate and a good directivity.

In conventional phase shifter designs, the phase is usually varied by adjusting the propagation constant with inserting external ferrite, dielectric. However, the inserted loss of ferrite and dielectric decreases the efficiency, and the huge size of ferrite material limits the operation frequency. (See Chang, C., Guo, L., Tantawi, S. G., Liu, Y., Li, J., Chen, C. and Huang, W., 2015. *A new compact high-power microwave phase shifter*. IEEE Transactions on Microwave Theory and Techniques, 63(6), pp. 1875-1882).

Currently, RF polarizers are usually realized by complex structures such as iris, septum, corrugations and grooves that convert circular polarization to linear polarization. This increases electromagnetic fields and thus significantly reduces the devices power handling capabilities due to heating and breakdown. These conventional devices suffer from limitations and drawbacks associated with their basic design (See Franzi et al., Tantawi, S. G., 2004. *Multimoded reflective delay lines and their application to resonant delay line rf pulse compression systems*. Physical review special topics-accelerators and beams, 7(3), p. 032001).

Thus, there exits a need for improved RF waveguide devices for high-power systems that are more compact. There is further needs for such devices that have broadband capabilities. There is additionally a need for such devices that can be tuned without requiring complex structures and that maintain high-power handling capabilities.

BRIEF SUMMARY OF THE INVENTION

The present invention relates improves RF multi-port waveguide devices with inherently-high power handling and that are more compact than conventional waveguide devices.

In one aspect, the RF waveguide device includes a rectangular waveguide with two circular waveguides extending from opposing broad walls of the rectangular waveguide. In some embodiments, the rectangular waveguide has two symmetric rectangular waveguide ports. In some embodiments, the two symmetric rectangular waveguide ports feed a cylindrical transmission line via overmoded rectangular waveguides. In some embodiments, such waveguide are stacked in a network to accommodate additional ports or capabilities. In some embodiments, the waveguide includes an adjustable biasing structure on a respective circular waveguide, for example, a magnet or choke design, that is mounted on a movable plunger. Such multi-port waveguides and waveguide networks can be configured as isolator or directional coupler and by use of a movable shorting structure, an tunable isolator or directional coupler.

In another aspect, the invention pertains to a multi-port waveguide that includes: a rectangular waveguide extending along an x-y plane between a first end and a second end opposite the first end, where the rectangular waveguide has opposing broad walls and opposite side walls, the rectangular waveguide has a first port and a second port disposed at or near the first end, where each of the first port and second port are single moded, the rectangular waveguide has a third port and a fourth port disposed at or near the second end, where each of the third port and fourth port are single moded; and a first circular waveguide extending from a first broad wall of the rectangular waveguide to a fifth port supporting at least two TE modes such that the multi-port waveguide can function as a six port polarizer.

In some embodiments, the multi-port waveguide further includes matching posts extending in a z-direction along corresponding outer facing sidewalls of the rectangular waveguide extending to each of the first and second ports, and matching posts extending in a z-direction along corresponding outer facing sidewalls of the rectangular waveguide extending to each of the third and fourth ports. In some embodiments, the multi-port waveguide further includes a pair of phase shift indentions extending in a z-direction along opposite sides of the circular waveguide portion extending to the fifth port. In some embodiments, the multi-port waveguide further includes a pair of inductive rectangular posts disposed on opposite sides of the circular waveguide in a y-direction portion along a center portion of the broad walls of the rectangular portion and extending in a z-direction. In some embodiments, the multi-port waveguide further includes a pair of inductive rectangular dents along outer facing sides of the rectangular waveguide on opposite sides of the circular waveguide portion in a x-direction, the pair of inductive rectangular dents extending in a z-direction and formed as indentations within the sidewalls of the rectangular waveguide. In some embodiments, the multi-port waveguide includes all of or any combination of the above described features.

In some embodiments, the fifth port of the multi-port waveguide further includes a short, which can be provided by a short circuit plate at a terminal end thereof. In some embodiments, a distal portion of the circular waveguide extending to the short is flared to a larger diameter than a proximal portion of the circular waveguide extending from the broad wall of the rectangular waveguide. The multi-port waveguide can further include a circular disc of non-reciprocal material disposed atop the short. The non-reciprocal material can be garnet, ferrite, or any suitable material. In some embodiments, a top surface of the non-reciprocal material is contoured inward toward the short-circuit plane to optimize operation and distribution of fields along the disc in differing modes. In some embodiments, the top surface of the non-reciprocal material is concave. The top surface contour can be elliptical or any suitable shape.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
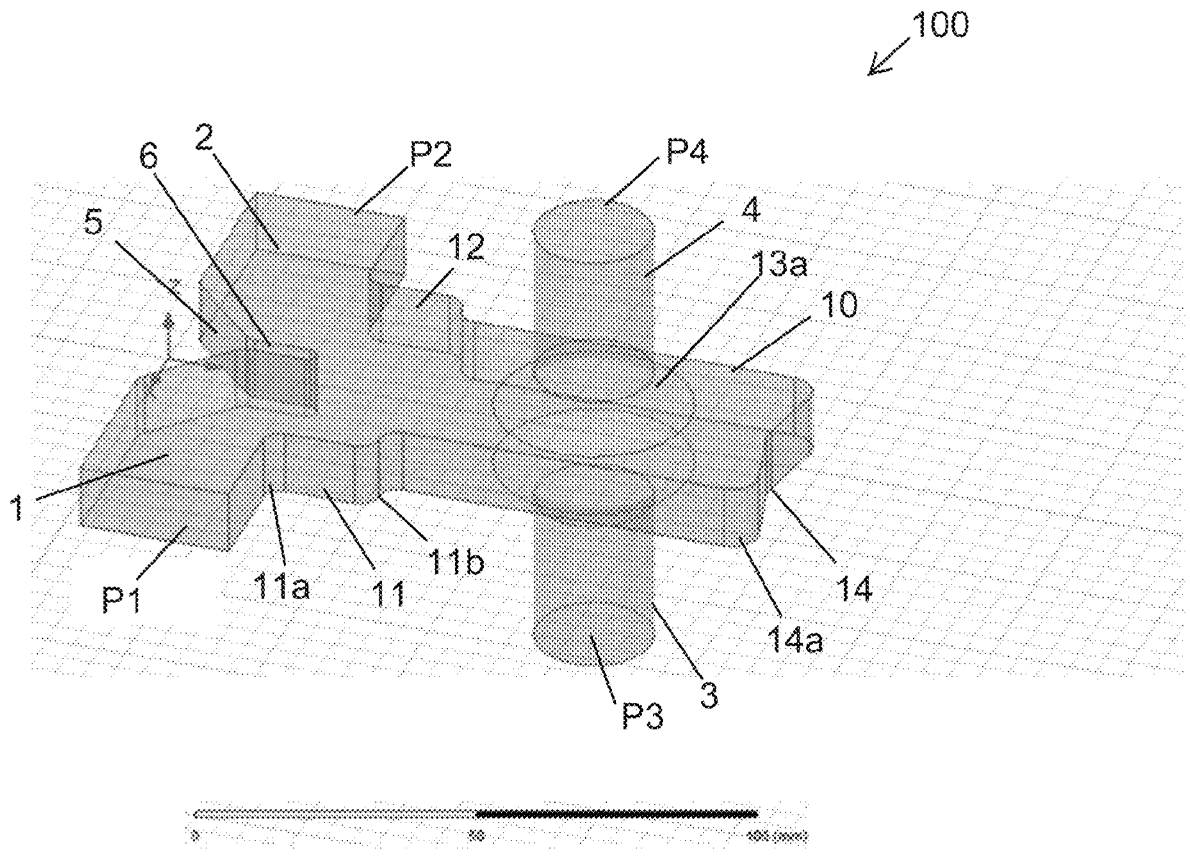
FIG. 1 illustrates a multi-port waveguide, according to some embodiments of the invention.

The present invention pertains to multi-port waveguide structures that are compact and have high-power handling capabilities. The present device utilizes a dual circular polarizer design within a multi-port waveguide structure so as to be both compact and capable of handling high-power operation and broadband. In some embodiments, the multi-port waveguides are adjustable so as to be tunable to handle a broad range of high-power applications. In embodiments, the wave-guide structures can be readily adapted to accommodate any of a broad range of bandwidths, including S, X and Ku bands.

Microwave waveguide polarizers are a wide class of devices including couplers, isolators, phase shifters, loads and duplexers. The devices are widely used in particle accelerators, communications and defense technologies. However, most of the existing designs are either lacking high power handling capabilities or huge in total size. These drawbacks can be further understood by referring to Franzi et al. There are a few different types of polarizer devices. The coupling rate of waveguide directional coupler is typically fixed such that it is difficult to get a tunable coupling rate and a good directivity. In phase shifter design, the phase is usually varied by adjusting the propagation constant by inserting external ferrite, dielectric. However, the inserted loss of ferrite and dielectric decreases efficiency, and the huge size of ferrite material limits operation frequency. See Change et al. 2015.

Additionally, RF polarizers are usually realized by complex structures such as iris, septum, corrugations and grooves to convert circular polarization to linear polarization. This increases electromagnetic fields and thus significantly reduce the devices power handling capabilities due to heating and breakdown. See Franzi et al.

Conventional circular polarizers for microwave applications typically consist of a circular and rectangular waveguides and large grooves usually ends up with exceptionally large devices. Complex structures are often used in such polarizer designs and still often end up with power handling reductions. Microwave waveguide polarizers including couplers, isolators, phase shifters, loads and duplexers have significant and wide applications in particle accelerators, medical devices, communications and defense technologies. Other kinds of circular polarizers, such as microstrip polarizers, have the disadvantage of narrow bandwidth and low efficiency due to losses of conductor, dielectric and surface wave. These aspects can be further understood by referring to Chang, C., Tantawi, S., Church, S., Neilson, J. and Larkoski, P., 2013. *Novel compact waveguide dual circular polarizer*. Progress In Electrornagnetics Research, 136, pp. 1-16. Typically, conventional waveguide polarizers use complex structures like stiff steps, pins and cones to realize the polarization transformation and port matching. These complex structures usually cause the field enhancement thus power handling reduction, as shown in Chang et al. 2015. This increases electromagnetic fields and thus significantly reduces the devices power handling capabilities due to heating and breakdown. Dual circular polarizers consisting of a circular and rectangular waveguides and large grooves usually ends up with exceptionally large devices. Complex structures are often used in the polarizer design but end up with reductions in power handling.

Generally, good isolation and power handling cannot be realized at the same time. Further, in the conventional coupler/phase shifter design, the phase is usually varied by adjusting the propagation constant with inserting external ferrite, or dielectric. However, the inserted loss of ferrite and dielectric decreases the efficiency, and the huge size of ferrite material limits the operation frequency (See Chang et al 2015). Again, the power capacity is limited due to the breakdown of ferrite and dielectric.

Some conventional directional couplers are easy to build but have several considerable disadvantages, such as the coupling rate being fixed, the coupling only being available on the forward path, and high loss due to internal termination. Conventional dual circular polarizers take advantages of the symmetries of the geometry with two overmoded rectangular waveguides and the circular polarization is performed with proper tuning of the input power. With incident power from two opposite rectangular ports, the output power at the circular port has opposite circular polarization. However, there is further need for devices that are broadband and that can accommodate a wide range of high-powered applications, yet still remain relatively compact.

The multi-port waveguide structures described herein address all the drawbacks of conventional designs noted above within the same device. These concepts can be adapted and incorporated into a network or system having multiple such waveguide structures by adopting the same idea for a variety of applications, particularly high-powered applications (e.g., hundreds of MW). The waveguide designs described herein are based on a compact dual circular polarizer design that can be readily modified to several devices, including but not limited to an isolator, directional coupler, and phase shifter. The polarizer is comprised of two symmetric rectangular waveguide ports which feed a cylindrical transmission line via overmoded rectangular waveguides. The superposition of the orthogonal modes within the circular waveguide, generates a right hand circularly polarized (RHCP) or left hand circularly polarized (LHCP) "like" wave. Thus, it enables good transmission at one port and excellent isolation at another port. However, the design herein can further include an additional cylindrical waveguide port that supports two additional modes, thereby allowing for full isolation and full transmission.

Six-Port Polarizer

In one aspect, the invention pertains to a 6-port RF waveguide network. In some embodiments, the network comprises a rectangular wave-guide extending between a first end and second end, with a pair of symmetrical rectangular wave-guide ports coupled to the first end and the second end being closed, a first circular waveguide extending from one broad wall of the rectangular waveguide that supports two modes, and a second circular waveguide extending from the opposite broad wall of the rectangular waveguide and supporting two modes. Effectively, each rectangular port is considered two ports since each circular waveguide supports two modes.

FIG. 1 shows an example of a multi-port waveguide 100 that includes two symmetric rectangular waveguide ports which feed a cylindrical transmission line via overmoded rectangular waveguides. The rectangular waveguide 10 extending along an x-y plane between first and second ends, the rectangular waveguide has opposing broad walls and opposite side walls. The waveguide includes a first port P1 and a second port P2 disposed at or near the first end. In this embodiment, the waveguide has a Y-shape or T-shape with the rectangular waveguide 10 defining the base and having a first top arm 1 and second top arm 2, the first arm 1 extending to port P1 and the second arm 2 extending to port P2. Each of ports P1 and P2 are rectangular waveguide ports and are single moded. A first circular waveguide 3 extends from a first broad wall of the rectangular waveguide to a third port P3 and a second circular waveguide 4 extends from the opposing broad side of the rectangular waveguide to a fourth port P4. In this embodiment, each of ports P3 and P4 support at least two TE modes. This design allows a user to either isolate through ports P1 or P2, or to direct all power through port P4. Port P4 can be isolated completely from ports P1 and P2, or all power from port P1 can be directed to port P4, or all power from port 2 can be directed to port P4. Conventional isolator designs isolate port 1 and 2 from each other, whereas this design allows these ports to be isolated or connected, for example, by satisfying the scattering matrix noted below, which allows the waveguide to be completely isolating or transmitting. This design lends itself to use as an isolator, however, it is appreciated that this or similar waveguide designs could be used in various other applications, including directional couplers, loads and duplexers.

In some embodiments, the waveguide further includes additional design features to provide transmission and/or reflection characteristics to achieve the scattering matrix below, including in inwardly angled V-shape portion 5 between ports P1, P2 that extends to a septum 6. Stepped portions 11, 12 between the base and each of first arm and second arm. Each of the stepped portions can additionally include curved inside corners 11*a*, 11*b*. The circular waveguides 3, 4 can include partial domed portions 13*a* extending around a base of the circular waveguide that extends from the broad walls of the rectangular waveguide. In this embodiment, the second end 14 of the rectangular waveguide is inwardly curved or angled towards a central lengthwise axis thereof, and further includes curved outside corners 14*a*. It is appreciated that in some embodiments, alternatives or modifications of these features could be used. The port P3 can be shorted to change the phase of reflection to produce an isolator behavior between ports P1 and P2. Adding the short circuit to port P3 makes transmission from P1 to P3 either 1 or 0. Typically, the short is a circular metal plate with a thin sheet or layer of garnet thereon, where there is a magnetic bias attached to the bias to create a magnetic field that has a direction axially parallel to the circular waveguide axis and in one direction. Exciting at port P1 creates an instant wave at the garnet layer in one direction of helicity and since the garnet has a magnetic field in one direction it reacts in one helicity. The thickness of the garnet layer and strength of magnetic field can be selected to make the system completely isolating in one direction and completely transmissive in the other direction. For example, regarding port P4, in case of complete isolation all power goes from port P1 to port P4, and a load can be applied to absorb this power. It is noted that the location of the short circuit will be different depending on whether the input is port P1 or port P2. It is noted that there are two distances along the circular waveguide 3 at which the short can be placed to achieve full isolation/transmission. In this design, the distance selected is that which makes the field on the ferrite very low in the case of full transmission, because this is when the device sees the full power. Accordingly, when the isolator is protecting a device, the device can see high power, which allows the device to be used in extremely high-powered operation, much higher than usual operation permitted by conventional isolators.

In one aspect, ports P1 and P2 are single moded (e.g., supporting TE10 mode) and the overall rectangular waveguide supports both TE10 and TE20 modes. The circular waveguides support two different modes (e.g., TE10 and TE20). In the process of bending in the normal rectangular waveguide portion, convergence happens between TE10 and TE20 modes underneath the circular waveguides, and the TE20 and TE10 mode, underneath couples to the two polarizations of the TE11 of the circular waveguide in one polarization and the TE11 of the circular waveguide in the opposite polarization. Advantageously, this design allows the TE10 and TE20 mode under the circular waveguides to be correct in amplitude and phase to achieve this coupling. It is appreciated that while a particular size is shown here, that the waveguide size and dimensions are frequency dependent such that the design can be scaled up or down to accommodate the frequency/power requirements of a given application and to maintain the rectangular waveguide ports at standard dimensions. This device is configured for 9.3 GHz, however it is appreciated that the design can be sized for various other frequencies (e.g. L band to W band).

In one aspect, the invention pertains to a waveguide device that is configured as an isolator in which an input port and an output port can be selectively isolated or connected to each other. To allow for this feature, the device is designed to satisfy a 6×6 scattering matrix. In some embodiments, the waveguide is designed satisfy the 6×6 scattering matrix shown below. This has the most general form of the matrix that supports the original polarizer scattering matrix and respects geometrical symmetry of the system (e.g., symmetry along XY, ZY planes).

$$S_{6\times 6}=\begin{pmatrix} e^{ie1} & 0 & 0 & 0 & 0 & 0 \\ 0 & e^{ie1} & 0 & 0 & 0 & 0 \\ 0 & 0 & e^{ie2} & 0 & 0 & 0 \\ 0 & 0 & 0 & e^{ie2} & 0 & 0 \\ 0 & 0 & 0 & 0 & e^{ie2} & 0 \\ 0 & 0 & 0 & 0 & 0 & e^{ie2} \end{pmatrix}\cdot$$

$$\begin{pmatrix} 0 & \beta & \alpha & 0 & \alpha & 0 \\ \beta & 0 & 0 & \alpha & 0 & \alpha \\ \alpha & 0 & 0 & \gamma & 0 & \delta \\ 0 & \alpha & \gamma & 0 & \delta & 0 \\ \alpha & 0 & 0 & \delta & 0 & \gamma \\ 0 & \alpha & \delta & 0 & \gamma & 0 \end{pmatrix}\cdot\begin{pmatrix} e^{ie1} & 0 & 0 & 0 & 0 & 0 \\ 0 & e^{ie1} & 0 & 0 & 0 & 0 \\ 0 & 0 & e^{ie2} & 0 & 0 & 0 \\ 0 & 0 & 0 & e^{ie2} & 0 & 0 \\ 0 & 0 & 0 & 0 & e^{ie2} & 0 \\ 0 & 0 & 0 & 0 & 0 & e^{ie2} \end{pmatrix}$$

The S-matrix has 4 complex numbers and 2 real numbers. Applying unitarity $S^TS=1$ condition leads to the matrix below that has one single parameter θ and 2 real parameters e1 and e2 assumed to be 0 in this case and are non-essential parameters in any case. In one embodiment, α is ⅔ and β is −⅓, γ is −⅓, notably δ is ⅔ for the optimum case.

$$S_{6\times 6}=\begin{pmatrix} 0 & -\sin(\theta) & \frac{\cos(\theta)}{\sqrt{2}} & 0 & \frac{\cos(\theta)}{\sqrt{2}} & 0 \\ -\sin(\theta) & 0 & 0 & \frac{\cos(\theta)}{\sqrt{2}} & 0 & \frac{\cos(\theta)}{\sqrt{2}} \\ \frac{\cos(\theta)}{\sqrt{2}} & 0 & 0 & \frac{1}{2}(\sin(\theta)-1) & 0 & \frac{1}{2}(\sin(\theta)+1) \\ 0 & \frac{\cos(\theta)}{\sqrt{2}} & \frac{1}{2}(\sin(\theta)-1) & 0 & \frac{1}{2}(\sin(\theta)+1) & 0 \\ \frac{\cos(\theta)}{\sqrt{2}} & 0 & 0 & \frac{1}{2}(\sin(\theta)+1) & 0 & \frac{1}{2}(\sin(\theta)-1) \\ 0 & \frac{\cos(\theta)}{\sqrt{2}} & \frac{1}{2}(\sin(\theta)+1) & 0 & \frac{1}{2}(\sin(\theta)+1) & 0 \end{pmatrix}$$

With appropriate choice of the parameter θ, while adding a short circuit to port 3, the location of the short circuit along the Z-axis can make the transmission from port P1 to port P3 either 1 or 0. The correct value for the parameter $$\theta \text{ is } \mathrm{Sin}^{-1}\left(\frac{1}{3}\right).$$

With this value in place, a suitably sized piece of garnet material can be placed in the port to change the phase of the reflection from port P3 depending on the helicity of the incident wave. This results in an isolator behavior between ports P1 and P2.

Figure 2A:
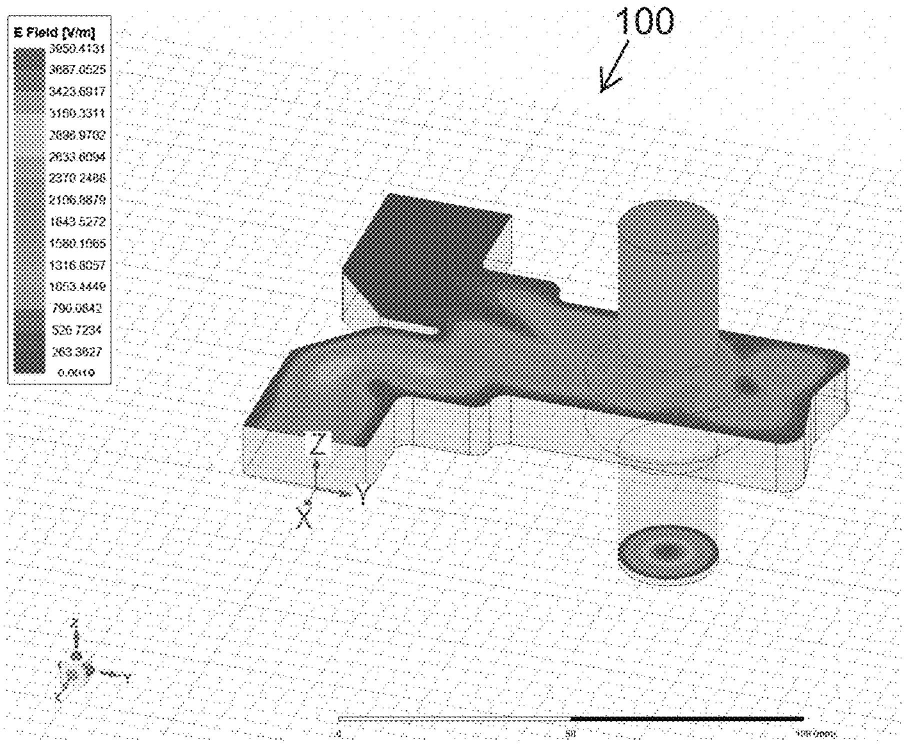
FIGS. 2A-2B illustrate an electric field model demonstrating isolator behavior between ports P1 and P2 of the multi-port waveguide of FIG. 1.
Figure 2B:
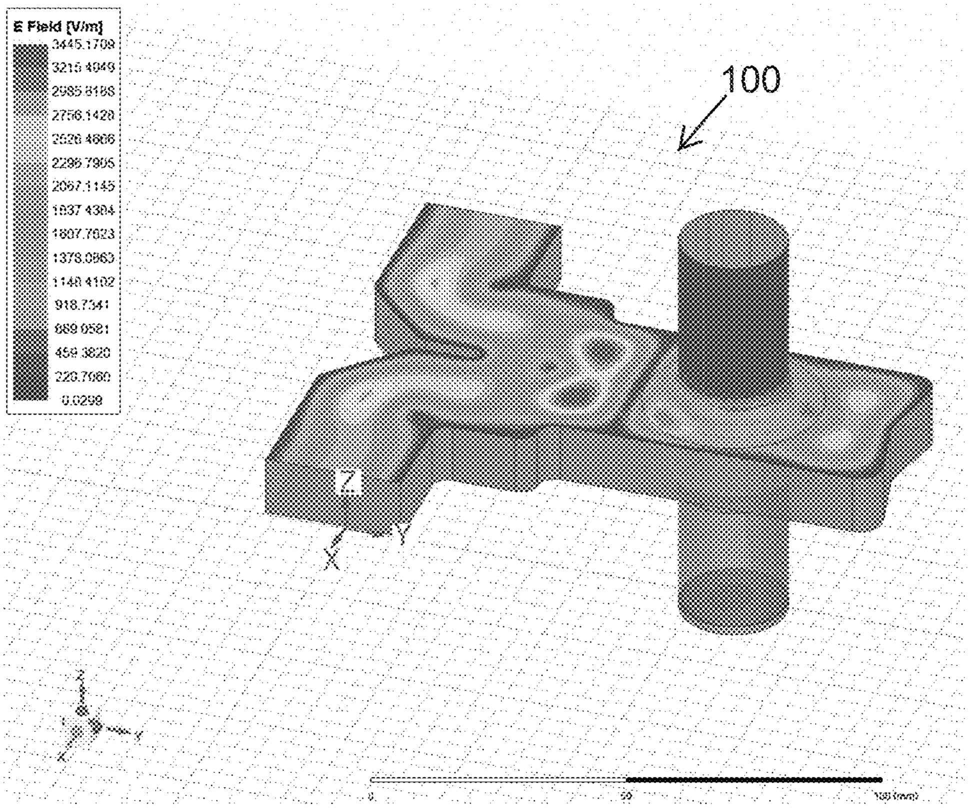

FIG. 2 shows simulation results of the 6-port isolator that demonstrates the isolator behavior between ports P1 and P2. This simulation was performed by high-frequency simulation software (HFSS). The S matrix data, included below in Table 1, shows the asymmetry where one port receives S12 has a value of −0.0412 dB and S21 has −38.9 dB.

TABLE 1

| S Matrix Data | | | | | | |
|---|---|---|---|---|---|---|
| Freq | | S:1 | S:2 | S:3:1 | S:3:2 | S:3:3 |
| 9.3 GHZ | 1 | (−35.4, −12.5) | (−0.0412, 74.5) | (−39.6, −156) | (−37.6, −82.6) | (−47.4, 81.8) |
| | 2 | (−38.9, 154) | (−35.4, −12.8) | (−3.04, −73.2) | (−3.06, 15.2) | (−48.2, 138) |

TABLE 1-continued

| S Matrix Data | | | | | |
|---|---|---|---|---|---|
| Freq | S:1 | S:2 | S:3:1 | S:3:2 | S:3:3 |
| 3:1 | (−3.04, −73.2) | (39.6, −156) | (−6.04, 141) | (−6.07, 47.9) | (−51.2, −123) |
| 3:2 | (−3.06, −165) | (−37.7, 97.2) | (−6.07, −132) | (−6.01, 138) | (−51.3, 146) |
| 3:3 | (−48.2, 138) | (−47.4, 81.9) | (−51.2, 123) | (−51.3, −34.3) | (−68, 3.45) |

In one aspect, the circular waveguide ports P3, P4 can be used to measure the forward and backward power between ports P1, P2. For example, when power is input at port P1 and output at port P2, a small portion of the power goes to port P3, such that measurement of power at P3 has correspondence to the power that is going to port P2. Similarly, when port P2 is the power input with port P1 as the output, a small portion of the power goes to port P4, which has correspondence with the power that is going to port P1. The amount of power that goes to P3 is controlled by the location of the short in P3. In some embodiments, the position of the short can be adjusted or controlled, such as by use of an adjustable plunger and/or magnet, as in other embodiments described below.

Figure 3:
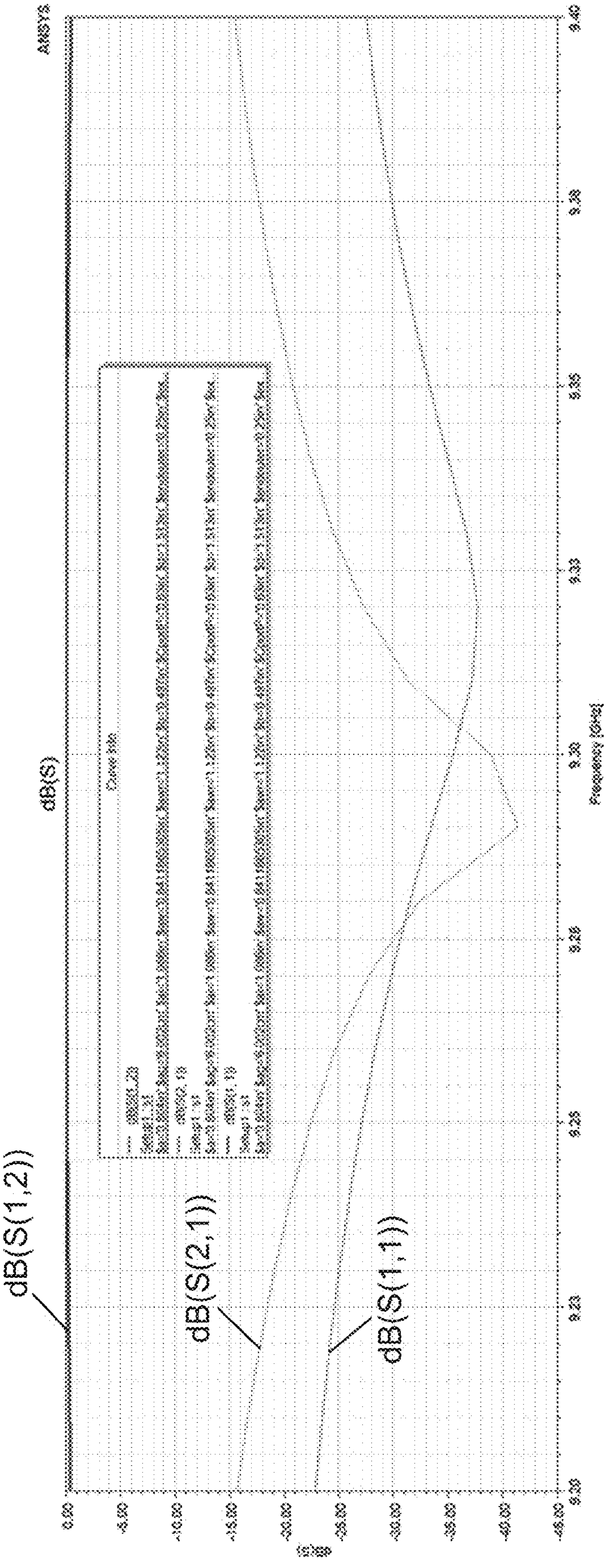
FIG. 3 illustrates the broad-band response of the isolator design of FIG. 1.

FIG. 3 shows the very broad band response, an additional advantage of this isolator design, in accordance with the waveguide concepts described herein. This waveguide design provides about 10 times broader band response than conventional circulators available on the market. This is much less susceptible to frequency shifts of the RF system. By contrast, a typical bandwidth for a classic device is 10 MHz such that the graph resembles a narrow notch with steep slopes on either side.

Figure 4A:
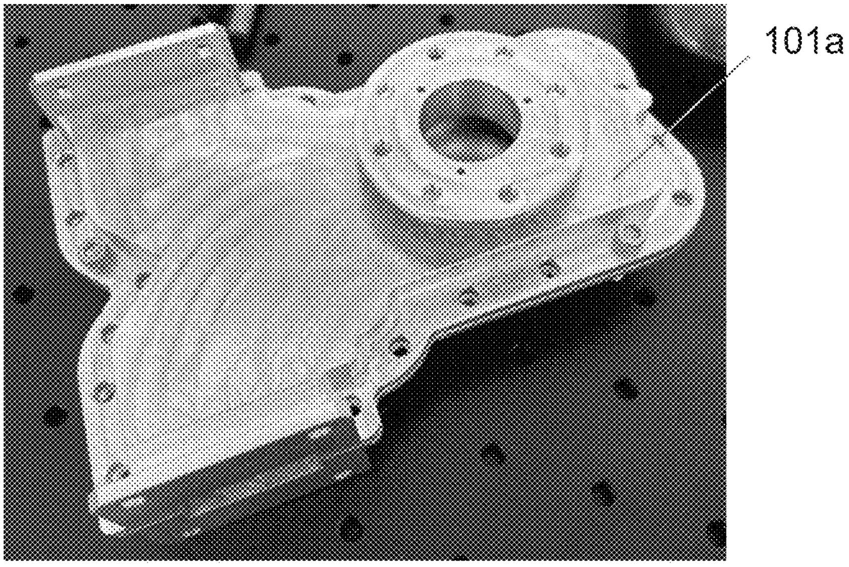
FIGS. 4A-4B show exemplary components of the RF waveguide structure in FIG. 1 before assembly and testing.
Figure 4B:
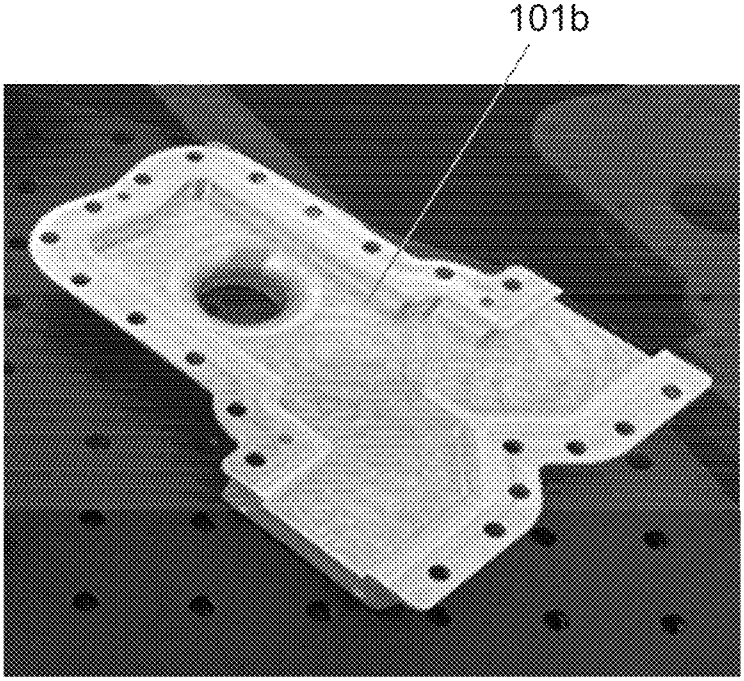

FIGS. 4A-4B show the components of the RF waveguide structure in FIG. 1 before assembly and testing. FIG. 4A shows the assembly of the aluminum components with the top half 101*a* and bottom half 101*b*. FIG. 4B shows only the bottom half 101*b* to show the interior. Typically, the components are made from aluminum with copper cladding on the interior surfaces. It is appreciated that the waveguide can be formed of any suitable conductive material, for example, brass, copper, silver, aluminum, or any metal having low bulk resistivity.

Figure 5:
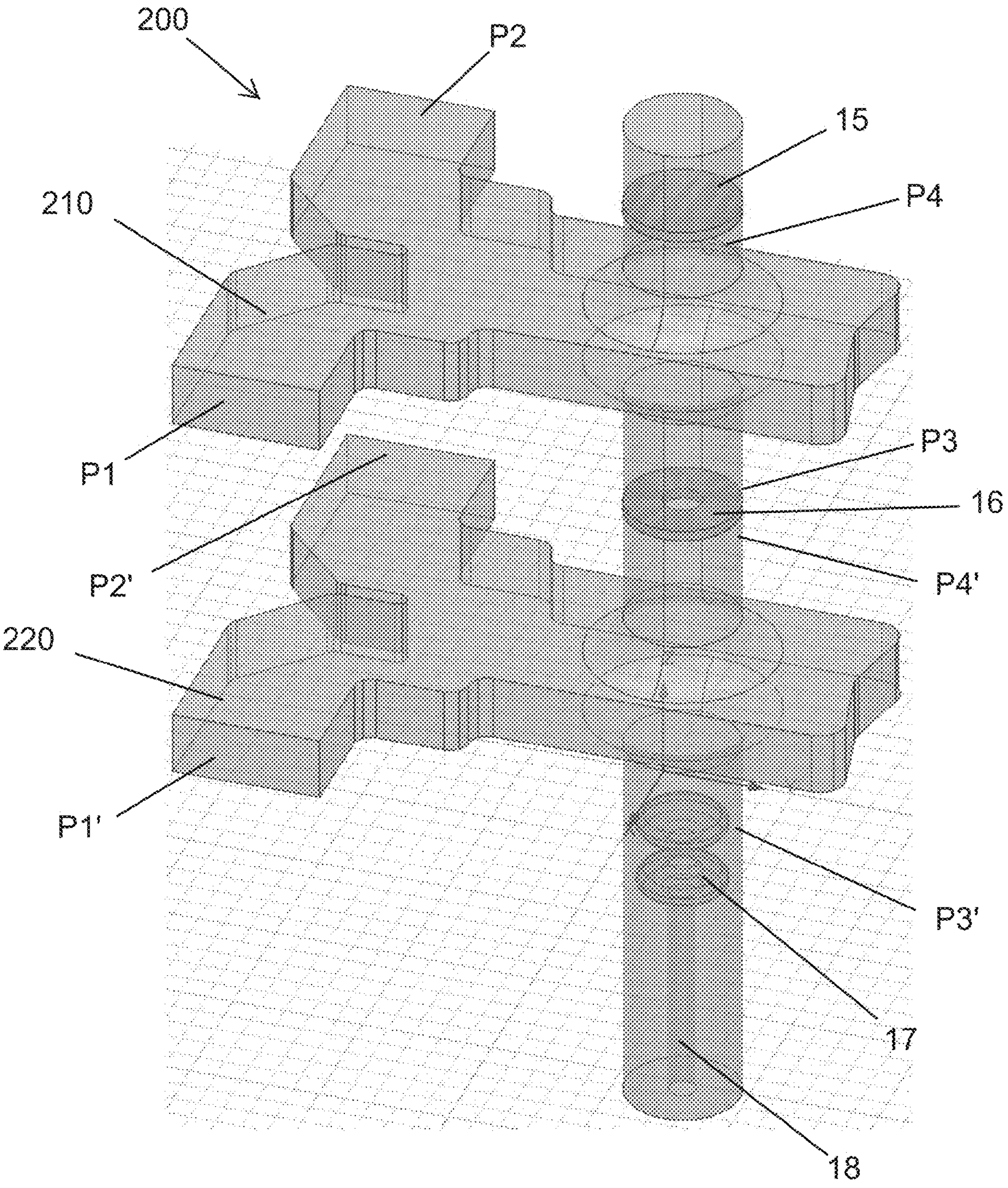
FIG. 5 shows stacked multi-port waveguides configured as a directional coupler, in accordance with some embodiments.

FIG. 5 shows a 6-port polarizer design 200, similar to that in FIG. 1, that has been stacked with another multi-port waveguide device and configured as a directional coupler. Specifically, this waveguide device is configured as a tunable directional coupler. In this design, the directional coupler include an upper waveguide device 210 and a lower waveguide device 220, each having first and second ports P1, P2 and first and second circular waveguides P3, P4. As shown, the waveguides are stacked such that the circular waveguide P3 of the upper waveguide is coupled with the circular waveguide P4 of the lower waveguide. In this embodiment, the circular waveguide P4 of the upper waveguide 210 is shorted by a circular piece of metal 15 disposed within the first (top) cylindrical waveguide of the upper 6-port waveguide device. The piece of metal is positioned at a location within the cylindrical waveguide where the S21 reaches minimum such that all power is distributed to the bottom circular port P3. Then a simulation is performed to verify that the directivity keeps almost constantly low when the distance varies between top and bottom circulators. Another metal piece with center hole 16 within connected circular waveguides P3, P4' enables differential nominal coupling rates through top and bottom waveguide devices. The bottom circular waveguide P3' of the lower waveguide device 220 includes a shorting structure 17, which is of a choke design having two spaced apart metal discs. This choke design shorts the circular waveguide without contacting the inside of the circular waveguide. The location of the shorting structure 17 can be adjusted, such as by movement of plunger 18, to tune the device.

Figure 6A:
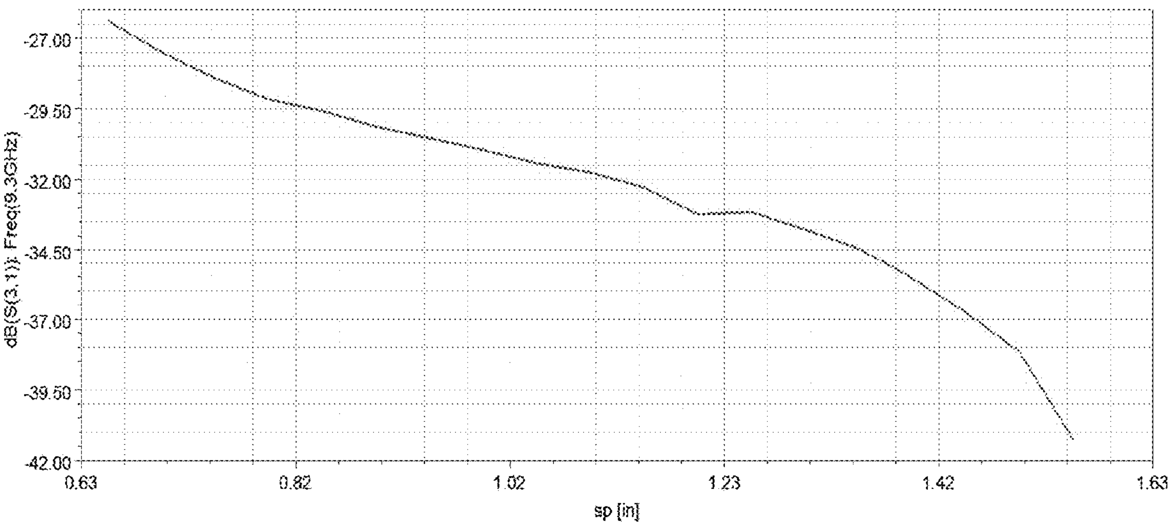
FIGS. 6A-6B show coupling rates and directivity of the directional coupler in FIG. 5.
Figure 6B:
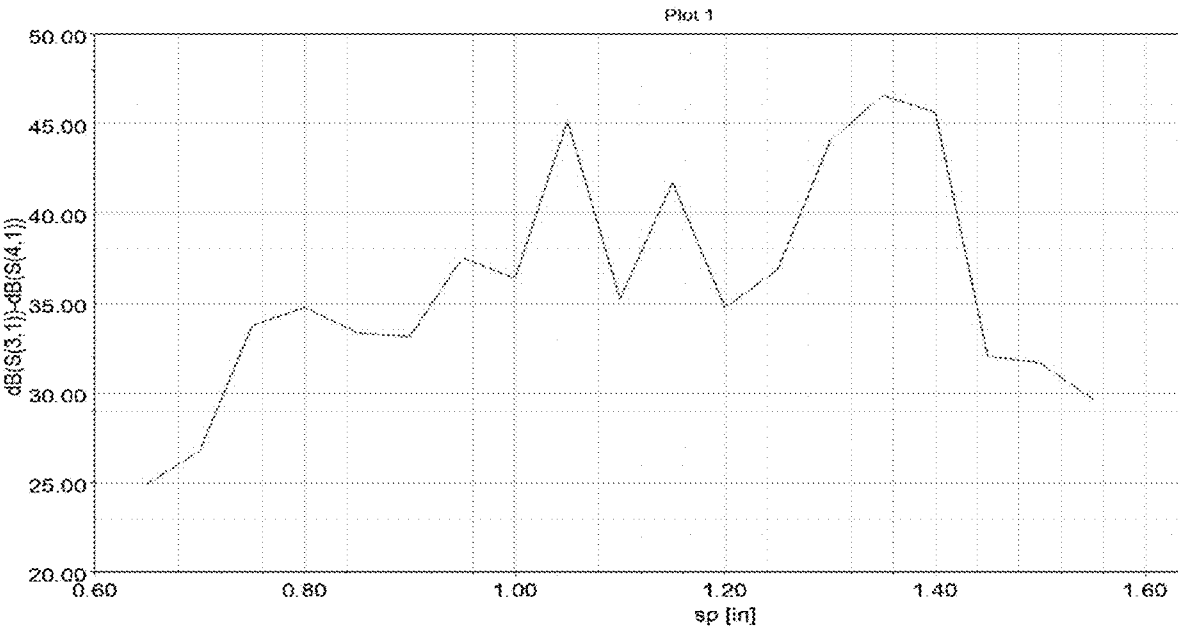

FIGS. 6A-6B show the coupling rates and directivity based on the plunger positions of the shorting structure in the lower circular waveguide structure of the lower waveguide of the direction coupler in FIG. 5. As shown in FIG. 6A, the coupling rate for this device can be tuned from 27 to 41 dB as the plunger 18 at the bottom circular waveguide moves short 17 by +−0.5 inches. FIG. 6B shows changes in directivity as the plunger moves the short. These variation in coupling rates and directivity allows the waveguide structure to be tuned to accommodate differing power requirements as needed for a given application.

Figure 7A:
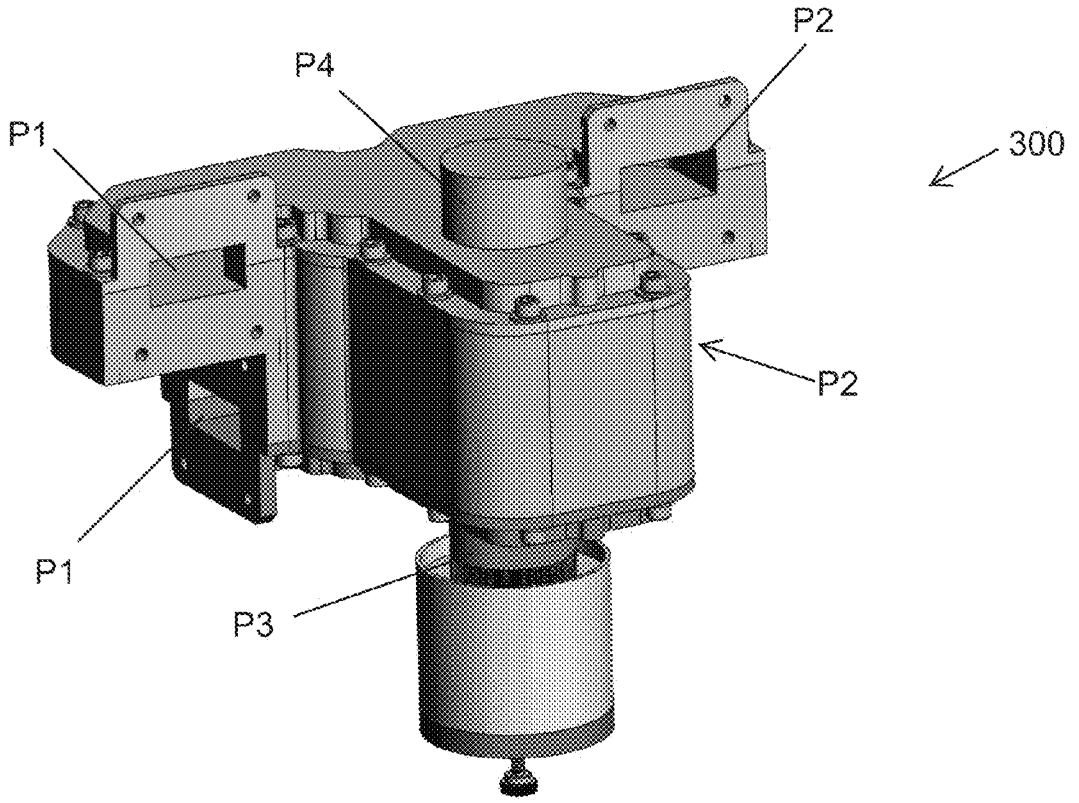
FIG. 7A-7D shows stacked multi-port waveguides configured as a four-port isolator with an adjustable biasing structure, in accordance with some embodiments.
Figure 7B:
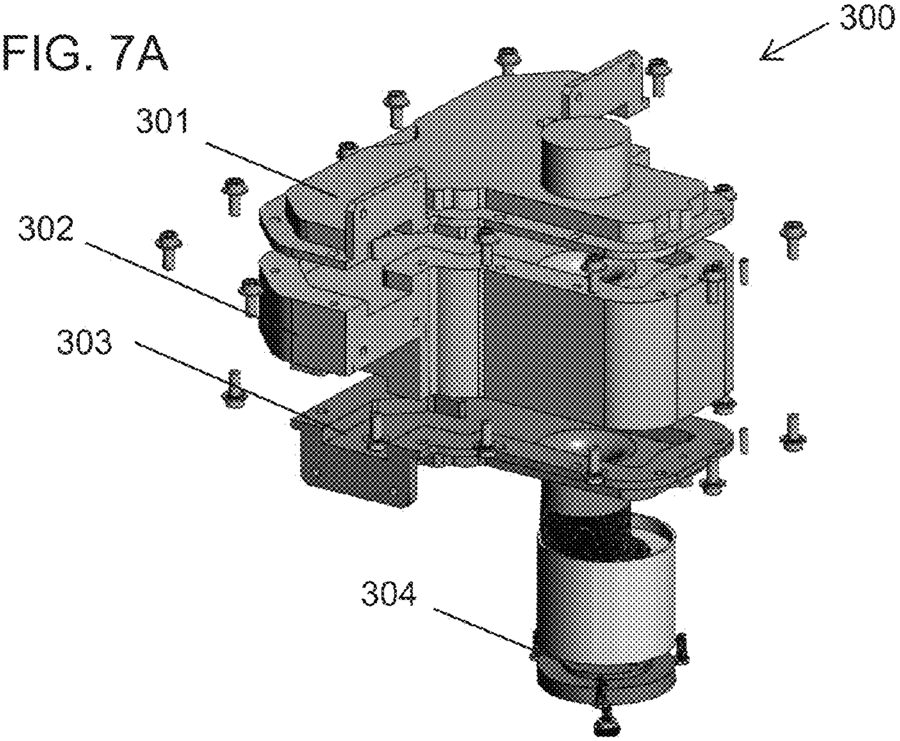
Figure 7C:
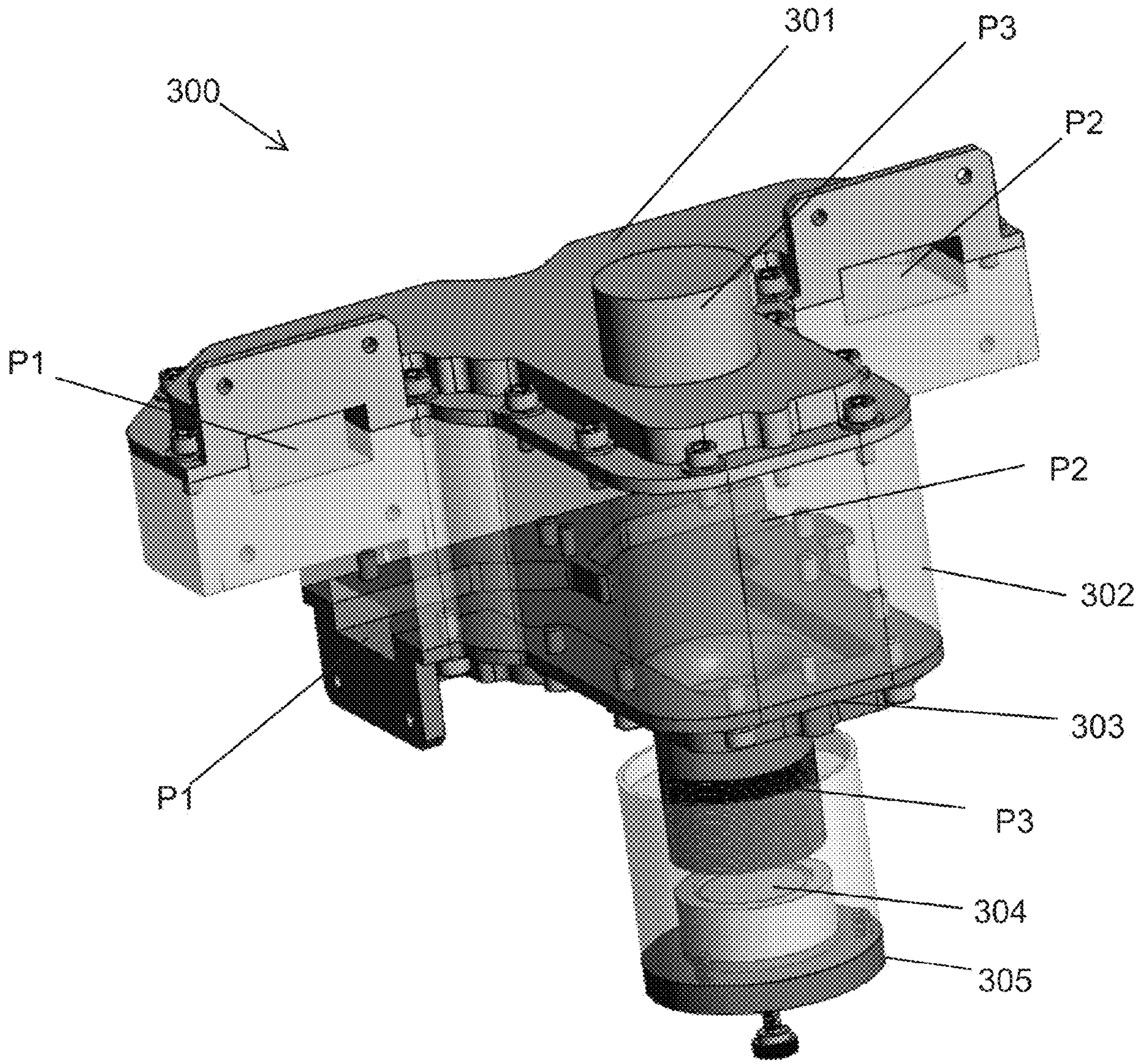
Figure 7D:
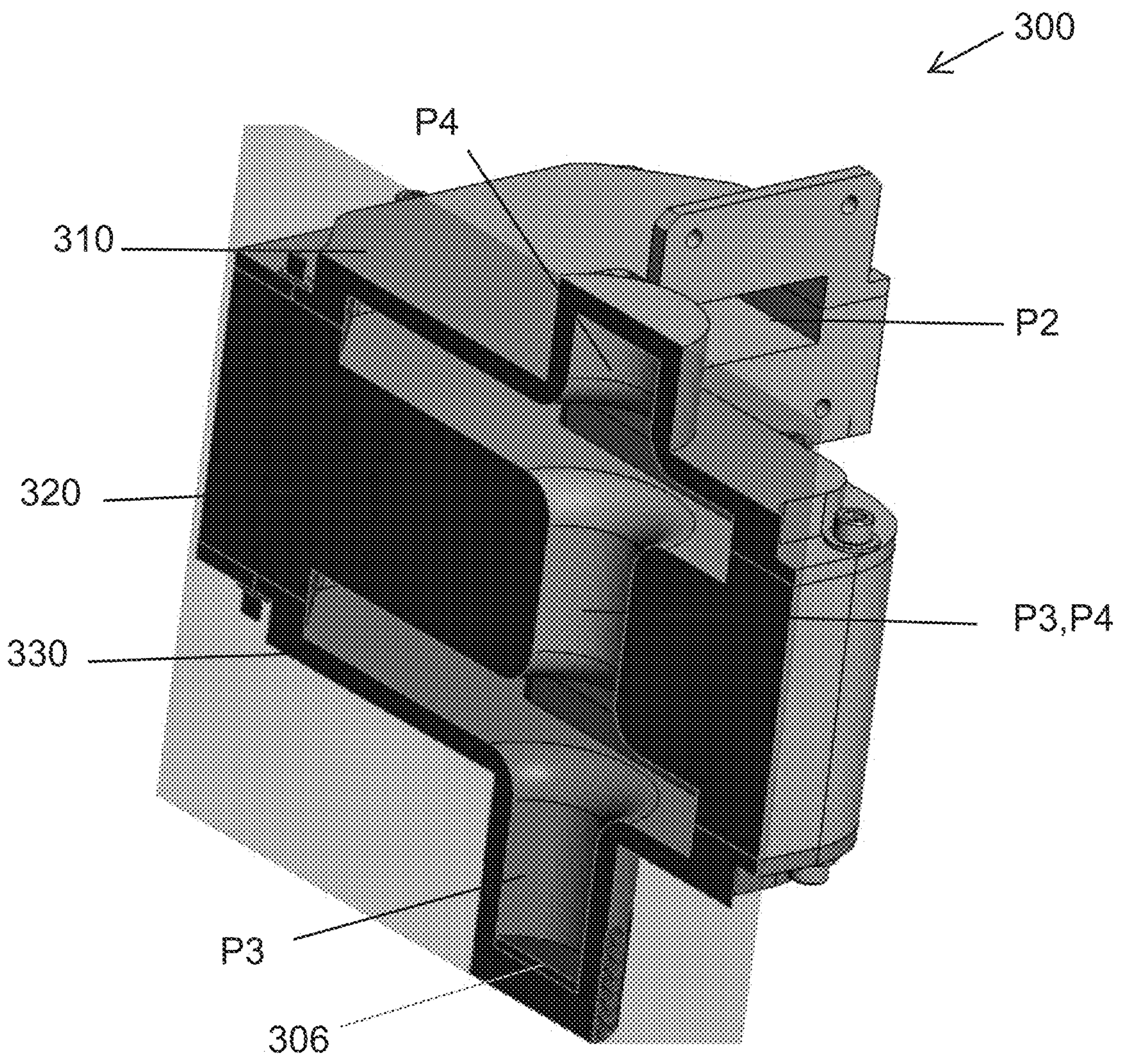

In another aspect, as shown in FIGS. 7A-7C, the multi-port waveguides can be configured as a 4-port isolator 300. Specifically, the waveguide device utilizes stacked multi-port waveguides, where the circular waveguides of adjacent waveguides in the stack are connected and the lower circular waveguide of the lower waveguide structure has a short and a removable/replaceable adjustable biasing structure 305 with a permanent magnet 304. FIG. 6A shows a perspective view. In this design, the directional coupler include an upper waveguide device having rectangular ports P1 and P2 and top and bottom circular waveguides P3 and P4 and a lower waveguide device similarly having rectangular ports P1 and P2 and top and bottom circular waveguides P3 and P4. The bottom circular waveguide P3 of the upper waveguide is coupled to the top circular waveguide P4 of the lower waveguide, as seen in the cross-section shown in FIG. 7D. In this embodiment, the short in P3 comprises a thin garnet disc 306 backed by a thin short plate made of copper that allows for the magnetic field from the adjustable biasing structure to bias the garnet disc 306 located at the end of the feature P3 (as shown in FIG. 7D), which makes the device non-reciprocal and hence the 4-port device acts as a 4-port circulator.

Figure 8A:
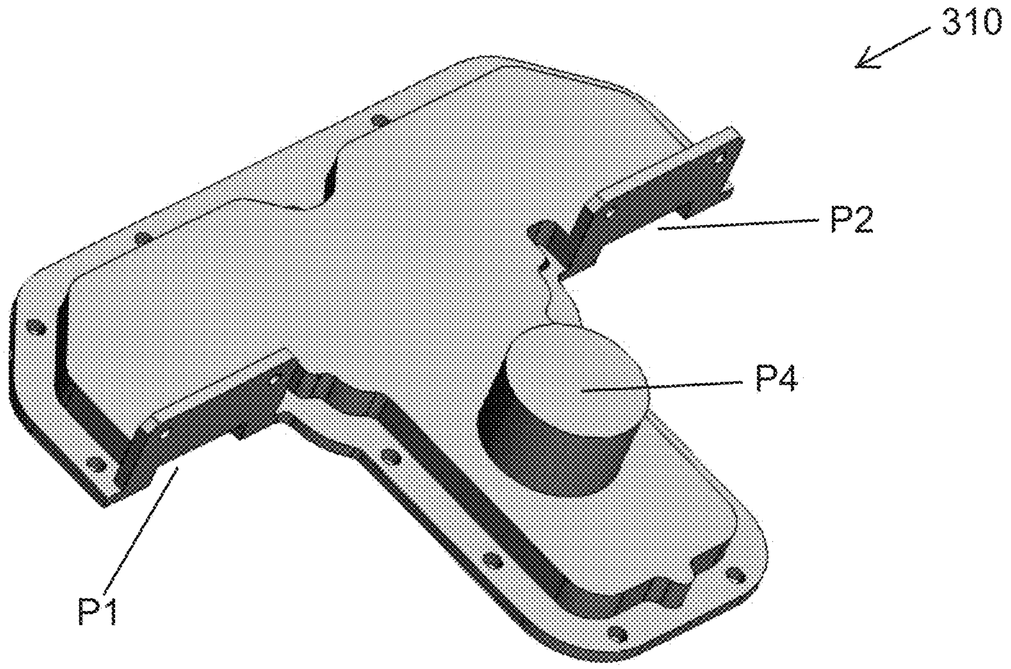
FIGS. 8A-8C show components of the isolator in FIG. 7A.
Figure 8B:
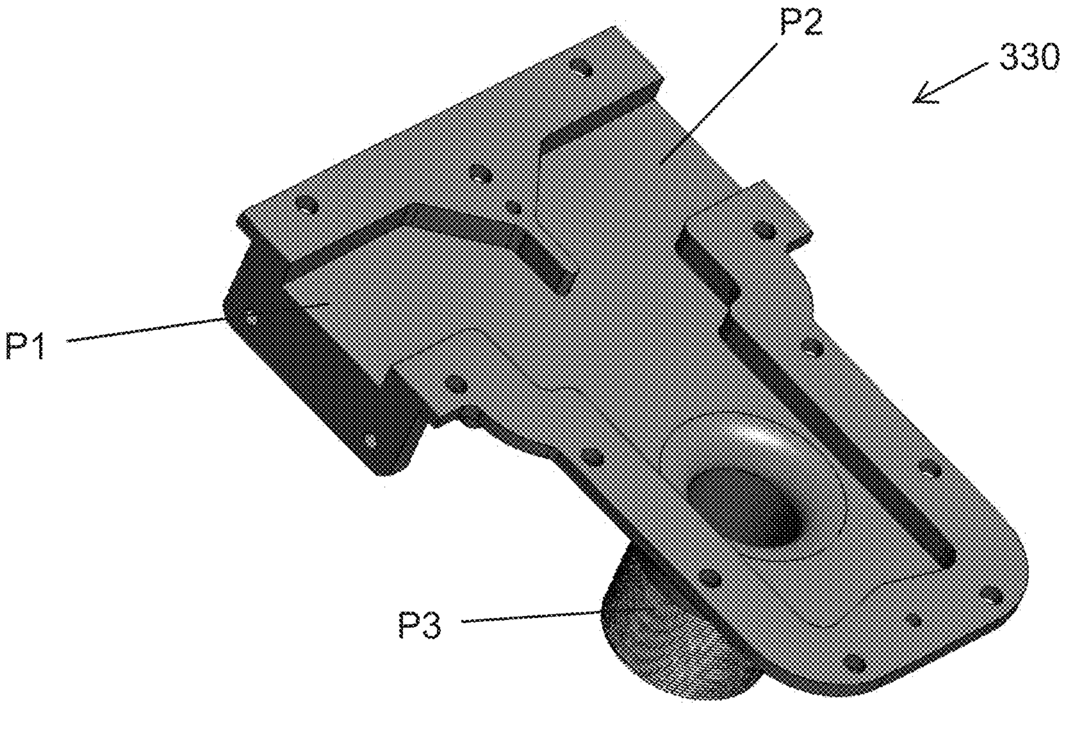

In this embodiment, the waveguide is defined as an assembly of three waveguide components, as shown in FIG. 6B, namely an upper component 301, an intermediate component 302 and a lower component 303. Together the upper component 301 and the intermediate component 302 form the upper waveguide structure, and the intermediate component 302 and the lower component 303 define the lower waveguide structure. The intermediate component 302 couples the top and bottom circular waveguides of adjacent waveguides. Detailed views of the upper component 310 and the lower component 330 can be seen in FIGS. 8A and 8B, respectively. The intermediate component is formed of like materials as the top and bottom component and engages each of the upper and lower components to form the stacked multi-port waveguide structures. Similar to previous waveguide embodiments, the components can be formed of any suitable material, preferably copper clad aluminum. In this embodiment, the first and second rectangular waveguide ports at the first end of the upper waveguide face along parallel directions toward the second end of the waveguide, as can be seen in FIG. 8A. The first and second rectangular waveguide ports P1, P2 of the lower waveguide extend in opposite directions perpendicular to the direction along which the overall rectangular waveguide extends (similar to the design in FIG. 1). This approach allows for ready access to each of the four rectangular ports. It is appreciated that the ports could be configured in various other direction if needed.

Figure 8C:
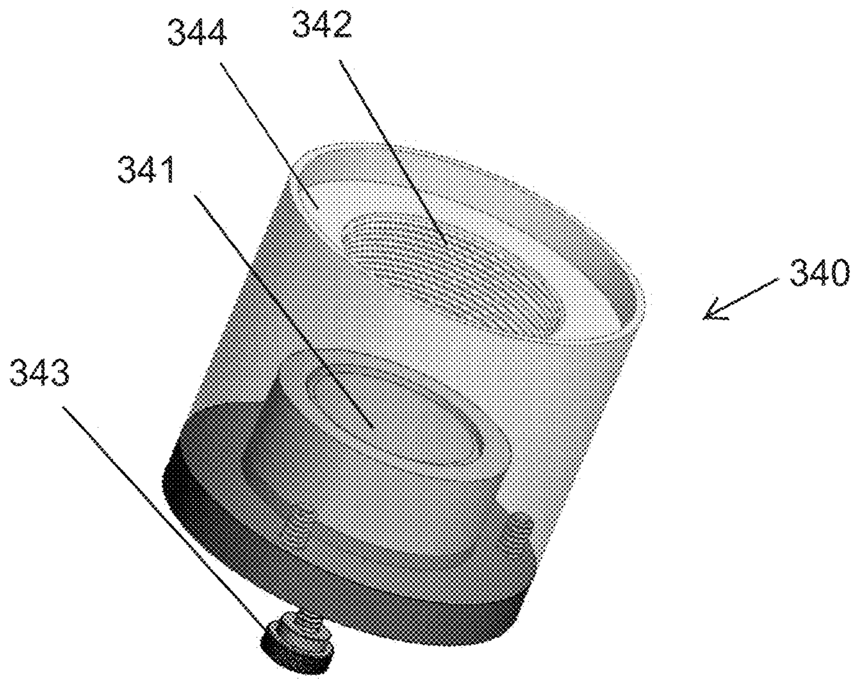
Figure 9A:
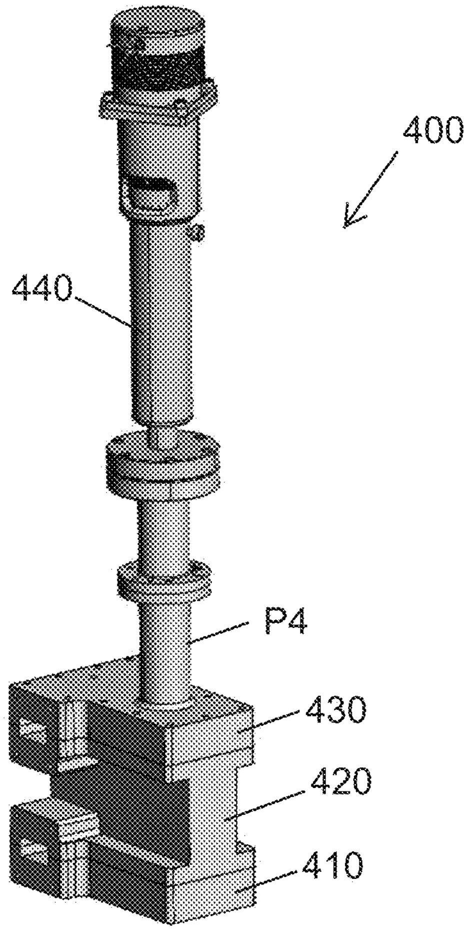
FIGS. 9A-9B show stacked multi-port waveguides configured as a directional coupler with a shorting structure on an adjustable plunger and a shielding structure for a magnetic of the shorting structure, in accordance with some embodiments.
Figure 9B:
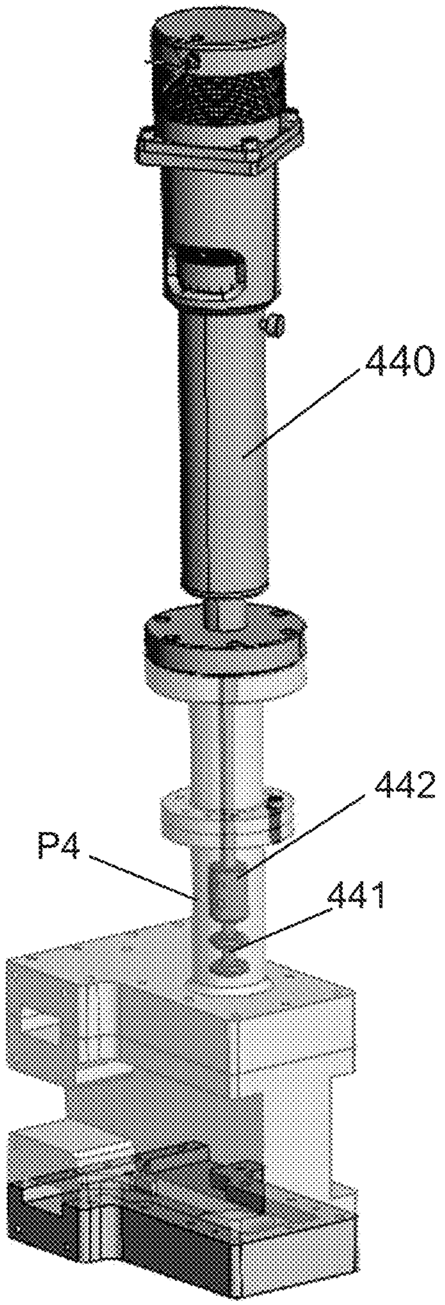
Figure 10:
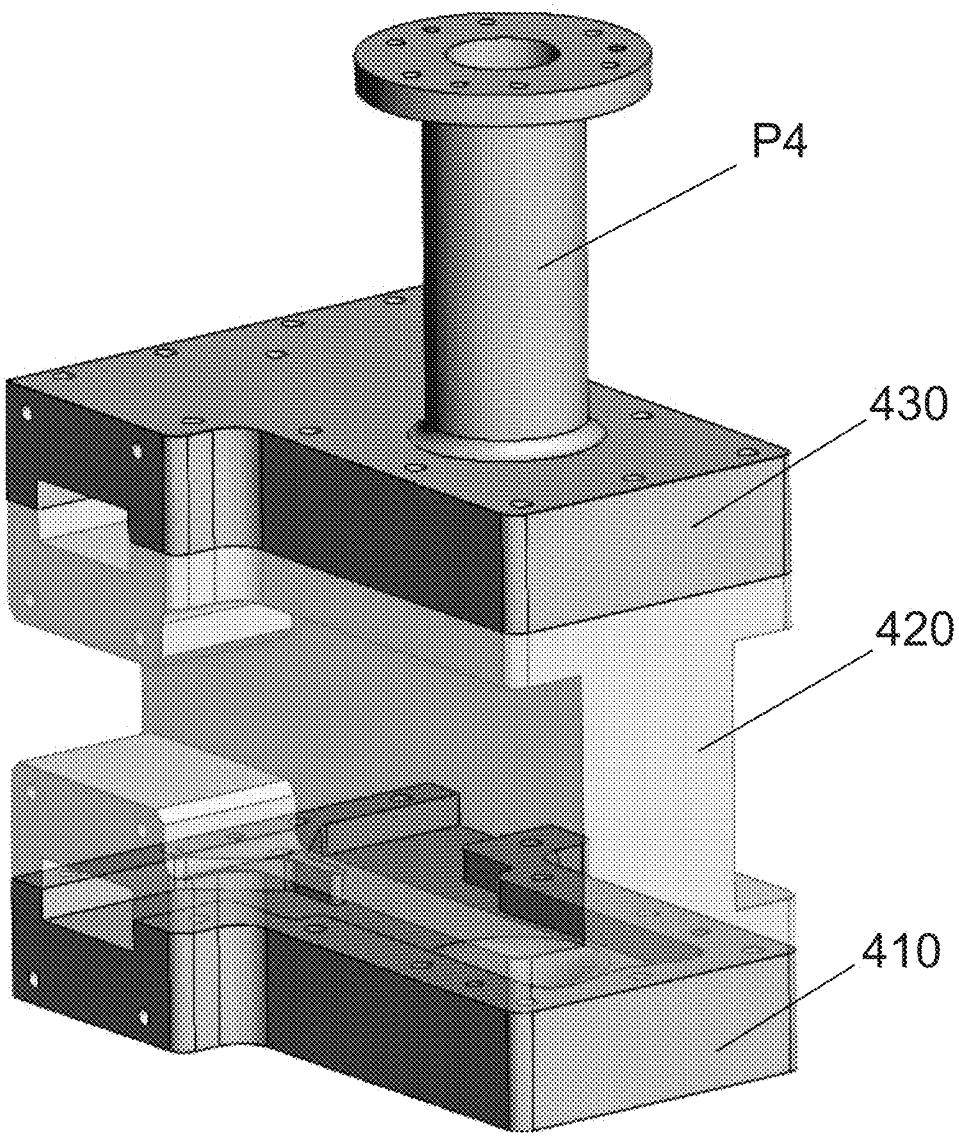
FIG. 10 shows stacked multi-port waveguides of the directional coupler in FIG. 9A.
Figure 11:
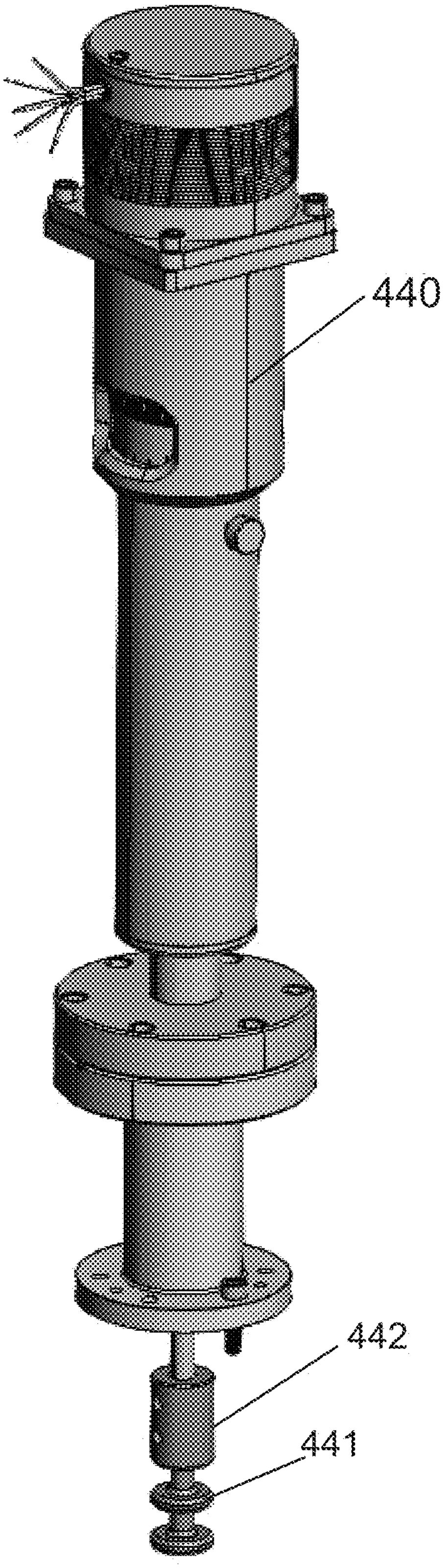
FIG. 11 shows an exemplary adjustable plunger and magnet with shielding for the directional coupler in FIG. 9A, in accordance with some embodiments.

In this embodiment, the top circular waveguide structure is shorted at a fixed location, and the bottom waveguide is shorted and further includes a biasing structure 340, shown in detail in FIG. 8C. In this embodiment, the biasing structure 340 is adjustable and/or removable, so as to allow adjustment of the isolator to accommodate differing power requirements or applications. In some embodiments, the biasing structure 340 includes a permanent magnet 341, an adjustable magnetic field shaping and shielding structure 344 with threads 342 that fit around the circular waveguide that houses the garnet (feature 306 in FIG. 7D) to provide the appropriate magnetic field that biases the garnet. The location of the magnet within the biasing structure 340 can be adjusted separately. The adjustment feature 343 is used to adjust the location of the magnet within the biasing structure 340 to adjust the relative position between the magnet and the garnet.

FIGS. 9A-11 depict another embodiment of a tunable direction coupler 400 utilizing multi-port waveguide structures. Similar to the previous embodiment, the device utilizes stacked multi-port waveguide structures that are defined by an upper, intermediate and lower components 410, 420, 430 and an adjustable short biasing structure 440 operably coupled with a circular waveguide structure P4 extending from one of the multi-port waveguides. In this embodiment, one circular waveguide includes a shorting structure 441 of a choke design having two connected metal discs 442. By use of this adjustable bias short without the presence of the garnet, the device acts as a directional coupler with adjustable coupling. The directional coupler can be broadband and tuned over a power range suitable for various high-powered operations.

The methods, systems, and devices discussed above are examples. Various configurations can omit, substitute, or add various procedures or components as appropriate. For instance, in alternative configurations, the methods can be performed in an order different from that described, and/or various stages can be added, omitted, and/or combined. Also, features described with respect to certain configurations can be combined in various other configurations. Different aspects and elements of the configurations can be combined in a similar manner. Also, technology evolves and some of the elements as described are provided as non-limiting examples and thus do not limit the scope of the disclosure or claims.

Specific details are given in the description to provide a thorough understanding of exemplary configurations (including implementations). However, configurations can be practiced without these specific details. For example, well-known circuits, processes, algorithms, structures, and techniques have been shown without unnecessary detail in order to avoid obscuring the configurations. This description provides exemplary configurations that do not limit the scope, applicability, or configurations of the claims. Rather, the preceding description of the configurations will provide those skilled in the art with an enabling description for implementing described techniques.

Also, configurations can be described as a process which is depicted as a flow diagram or block diagram. Although each can describe the operations as a sequential process, some of the operations can be performed in parallel or concurrently. Furthermore, examples of the methods can be implemented by hardware, software, firmware, middleware, microcode, hardware description languages, or any combination thereof. When implemented in software, firmware, middleware, or microcode, the program code or code segments to perform the necessary tasks can be stored in a non-transitory computer-readable medium such as a storage medium. Processors can perform the described tasks.

In another aspect, additional embodiments can be realized with additional features can enhance the above proposed polarizer concept. The first is another incarnation of the 6-port polarizer, shown in FIG. 12, in which only one circular physical port contains two modes, and the remaining ports are all rectangular ports.

Figure 12:
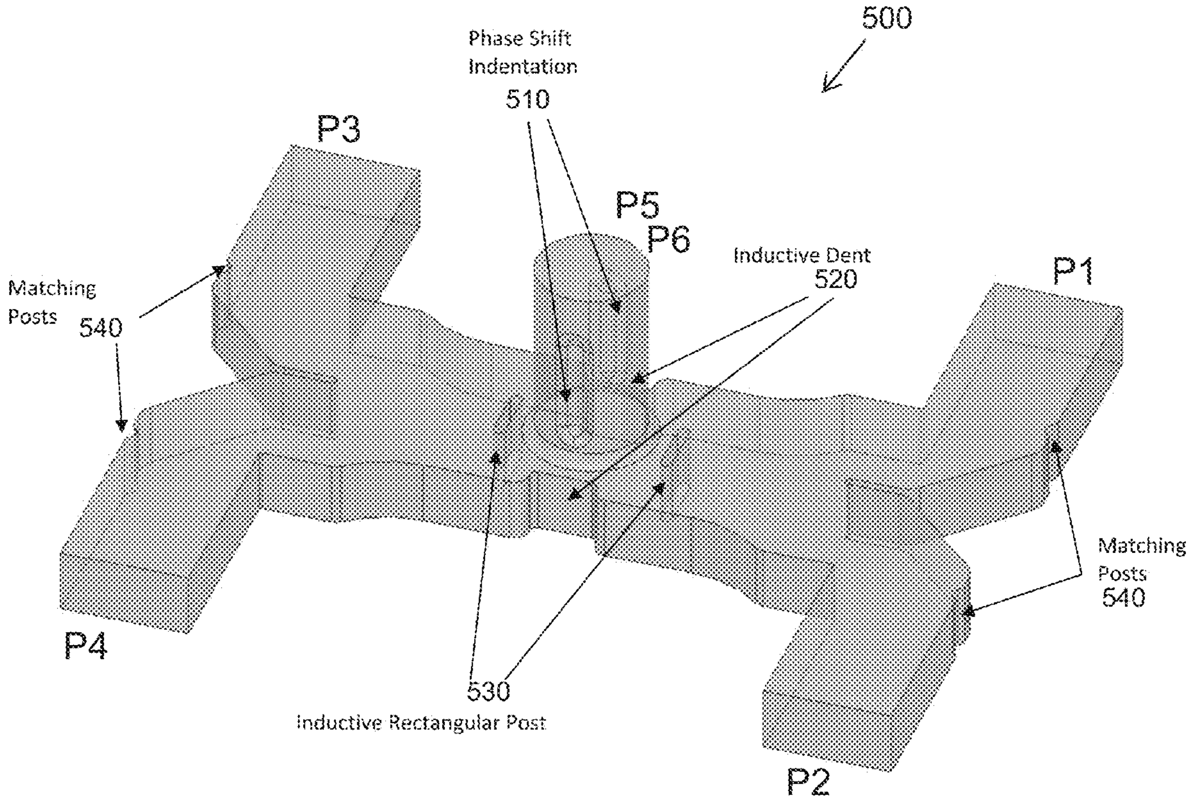
FIG. 12 shows an exemplary six port polarizer, in accordance with some embodiments.

FIG. 12 shows the geometry of exemplary six port polarizer 500. The port numberings are shown as P1, P2, P3, P4, P5, and P6. It is noted that port P5 and P6 represent two different modes of operation for the respective circular waveguide. Thus, the fifth port of the circular waveguide can act as port P5 or P6. The six port polarizer 500 can include additional features of the polarizer around the circular waveguide to enhance operation, these features include: 1) phase shift indentations 510; 2) inductive dents 520; and 3) inductive rectangular posts 530. Additionally, on the rectangular waveguide ports there can be four matching posts 540, extending vertically along corresponding portions of the rectangular waveguides extending to ports P1, P2, P3, and P4. This combination of features was designed to optimize performance of the device. It is appreciated that in other embodiments, these or similar features could be used individually or in any combination or include various other features if desired.

In some embodiments, the unitary scattering matrix of the device is given by:

$$S = \begin{pmatrix} 0 & 1/2 & 1/2 & 0 & i1/2 & -1/2 \\ 1/2 & 0 & 0 & 1/2 & i1/2 & 1/2 \\ 1/2 & 0 & 0 & 1/2 & -i1/2 & -1/2 \\ 0 & 1/2 & 1/2 & 0 & -i1/2 & 1/2 \\ i1/2 & i1/2 & -i1/2 & -i1/2 & 0 & 0 \\ -1/2 & 1/2 & -1/2 & 1/2 & 0 & 0 \end{pmatrix}$$

In this embodiment, the first 4-ports are the rectangular ports and ports P5 and P6 represent the two linearly polarized modes in the circular waveguide. Note that these two modes are being excited with a 90-degree phase shift and with equal amplitudes by any excitation from one of the rectangular ports P1 through P4 (i.e, inducing a circularly polarized wave). Furthermore, port P1 and port P3 excite them with the same helicity, while port P2 and P4 excite them in opposite helicity. It is also noted that ports P1 and P4 and ports P2 and P3 are completely isolated.

With this scattering matrix, a short circuit in the circular waveguide port would reflect modes 5 and 6 and the resulting structure is a four-port network. The resulting four port network, which depends on the phase 4), determined by the location of the short circuit is then given by:

$$S_4 = \begin{pmatrix} 0 & \frac{1}{2}(1-e^{i\phi}) & \frac{1}{2}(1+e^{i\phi}) & 0 \\ \frac{1}{2}(1-e^{i\phi}) & 0 & 0 & \frac{1}{2}(1+e^{i\phi}) \\ \frac{1}{2}(1+e^{i\phi}) & 0 & 0 & \frac{1}{2}(1-e^{i\phi}) \\ 0 & \frac{1}{2}(1+e^{i\phi}) & \frac{1}{2}(1-e^{i\phi}) & 0 \end{pmatrix}$$

Based on the above scattering matrix, the excitation of a signal in port P1 will divide the power between ports P2 and P3; the division ratio depends only on the angle ϕ; i.e, the location of the short circuit. Hence by choosing this angle, which could be done physically by moving the location of the short circuit, the power can be diverted completely from port P2 to port P3 and vice versa. Excitation of port P2 will divide the power between ports P1 and P4 and excitation from port P3 will do the same thing, dividing the power between port P1 and P4. Accordingly, excitation of port P4 will divide the power between ports P3 and P2.

There are many uses for the above device, one indeed could use it as a switch to divert the power from one port to another or use a variable power divider. Indeed, the location of the short circuit, and in turn the angle j of the reflection coefficient can be changed either mechanically or electronically by adding an active element at the end of the circular port.

Another important application of the above-mentioned device is to utilize it as a four-port circulator. This can be done by adding a nonreciprocal disk at the end of the circular port as described in previous embodiments. Excitation in port P1 will result in one helicity excited in the circular port while excitation in port P2 will result in the opposite helicity in the circular power. Then, the reflection at the circular port, due to a slab of ferrite or garnet material backed by a short circuit plate and biased with a magnetic field along the circular port axis, can be made different by 180 degrees for an excitation that comes from port P1 versus an excitation that comes from port P2. The result is that all the power from port P1 can be directed to port P2, an all the power excitation at port P2 will then be directed to port P4. Similarly, examining the signal excitation at ports P3 and P4 indicates that the device can operate as a four-port circulator.

In another aspect, an additional feature pertaining to the short of the circular waveguide port can further enhance the proposed polarizer concept. This aspect includes terminating the circular waveguide port with a nonreciprocal material at the short. This feature can result in a reflection coefficient that is different by 180 degrees for different incident helicities. The objective of this feature is to increase the power handling capability of the polarizer device. In particular, when the circulator is terminated by a short (i.e., short circuit plate) in the receiving end the circular waveguide port sees both the incident power and the reflected power.

Figure 13:
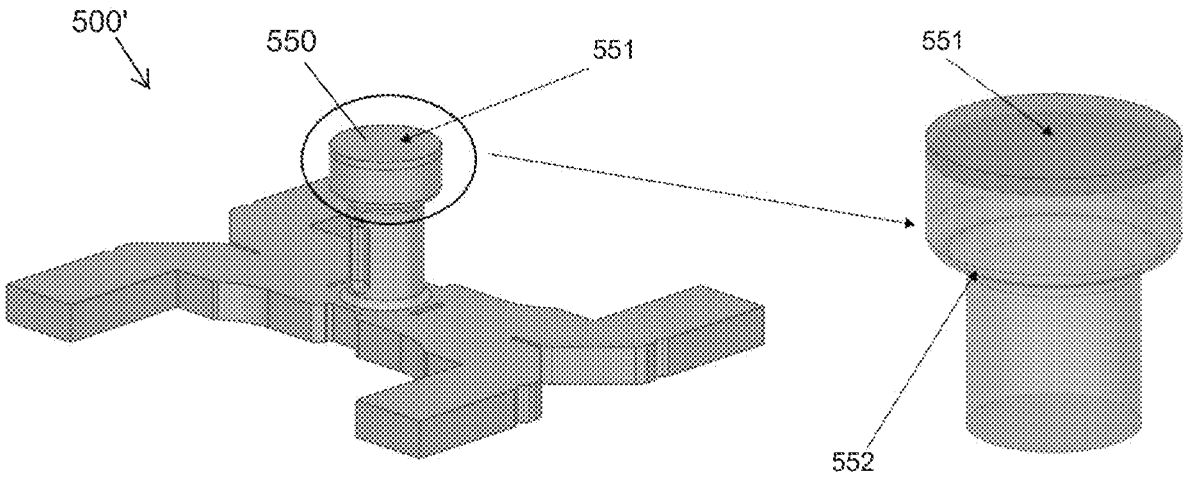
FIG. 13 shows an exemplary four port polarizer with flared circular waveguide, in accordance with some embodiments.

In some embodiments, this increased power handling provided by the short circuit can be mitigated by one or more features, preferably two features. First, the circular waveguide can be flared to a bigger diameter, as shown in FIG. 13, which shows the device 500' with a circular waveguide that includes flared portion 552, which is flared to a larger diameter than a more proximal portion so as to reduce the field on the nonreciprocal material. A disc 551 of non-reciprocal (e.g., slab of garnet or ferrite material) is disposed at the terminal end of the circular waveguide port along the short. This will result in lower power density and hence lower fields. However, this will also result in an over-moded system especially within the material (e.g., within the ferrite or garnet slab). This feature can be used to excite two different modes within the material, one for each helicity.

Figure 14A:
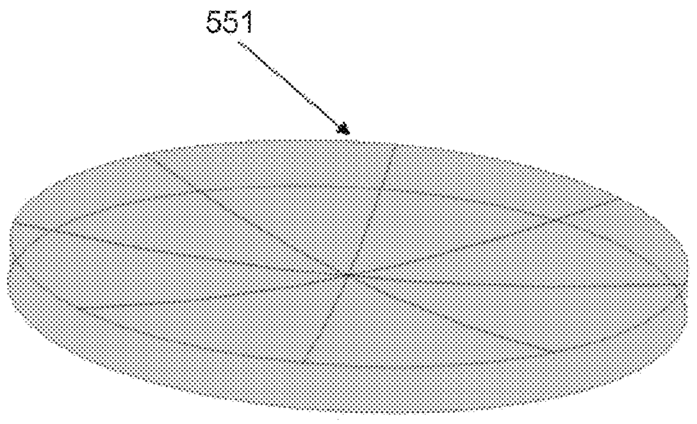
FIGS. 14A-14B show geometry of an exemplary carved garnet/ferrite disc for use with polarizers in accordance with some embodiments.
Figure 14B:
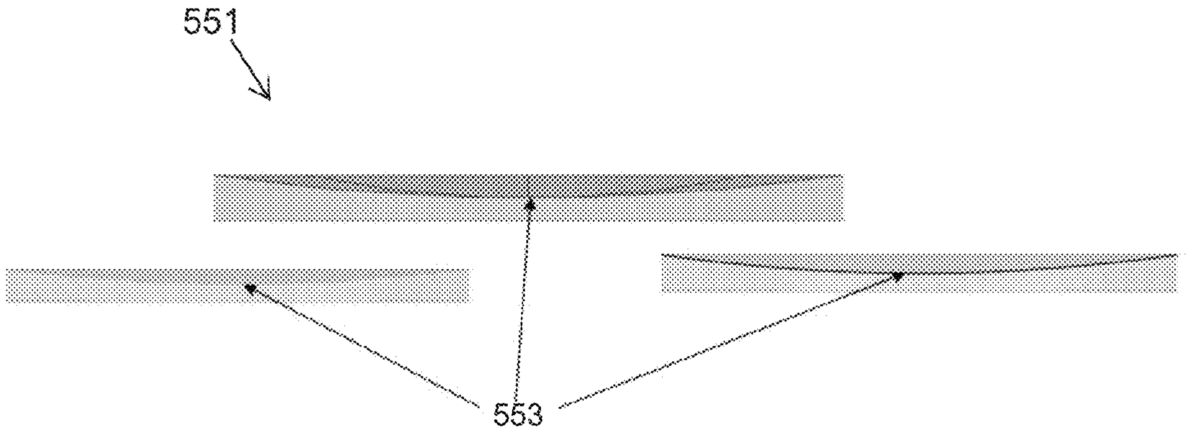

To tailor these modes so that the peak field within the material does not overlap, the slab material can be carved so that it is flat on one side (on the short side), and with curved indentation on the other side (outer facing side), as shown in FIGS. 14A-14B. As can be seen in FIG. 14A, the top surface of the slab of material of the disc is curved inward or concave. As shown in the side view of FIG. 14B, the top surface is indented inward while the bottom underside surface is flat for placemen atop the shorting plate. The top surface can be carved with an elliptical or any suitable shape to optimize performance. In this embodiment, the slab material is carved ferrite, though it is appreciated the material can be garnet or any suitable nonreciprocal material.

Figure 15A:
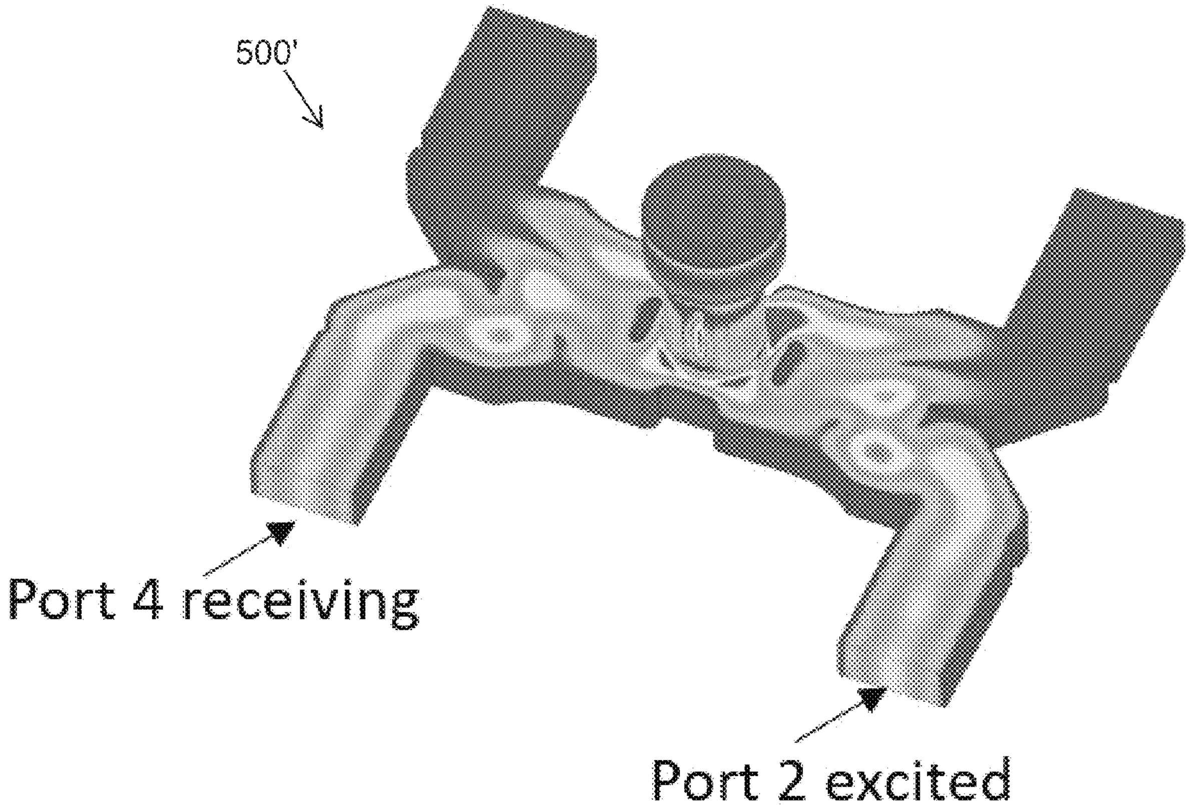
FIGS. 15A-15B and 16A-16B show the electric field excitation images of the polarizer in FIG. 13 and a detail of the short circuit portion of the circular waveguide port, which illustrates that the excited fields peak at different locations in the disc of non-reciprocal material in differing operating modes, in accordance with some embodiments.
Figure 15B:
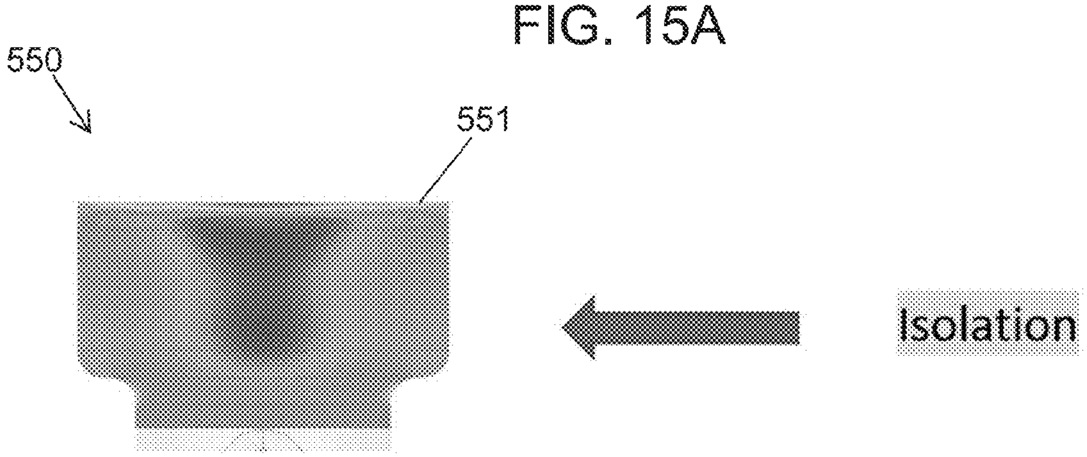
Figure 16A:
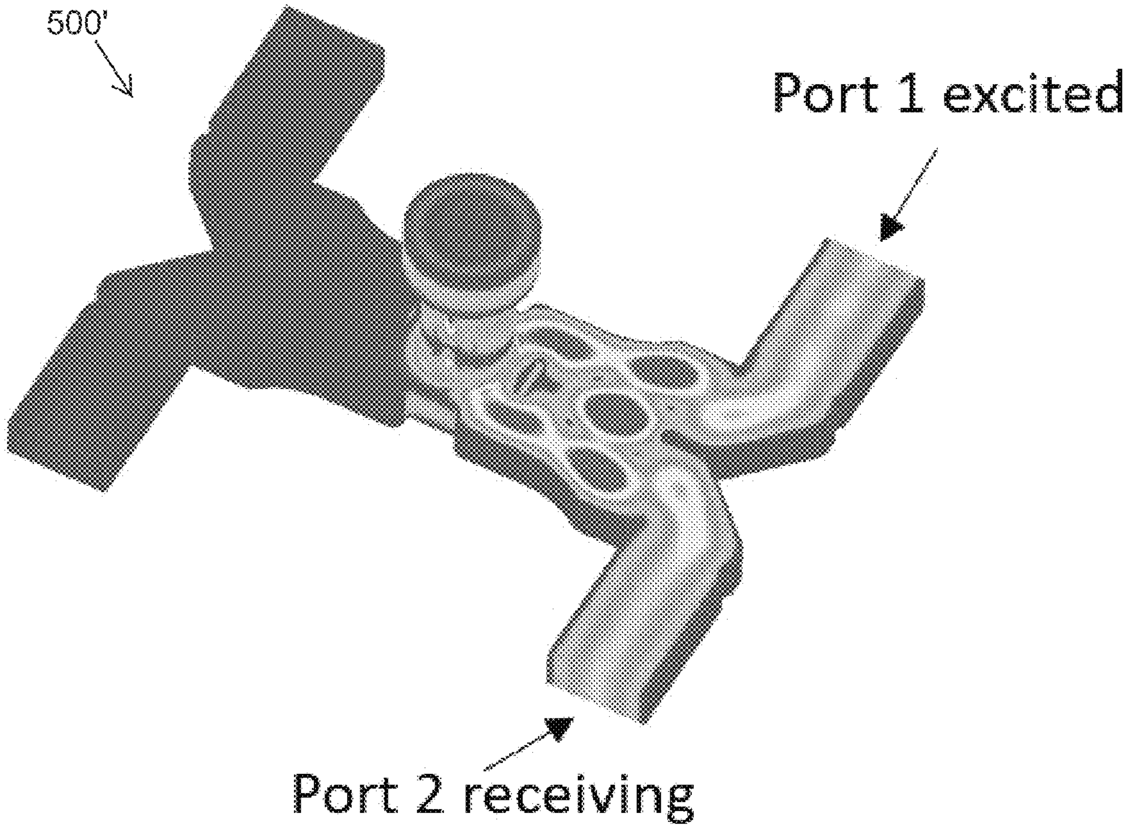
Figure 16B:
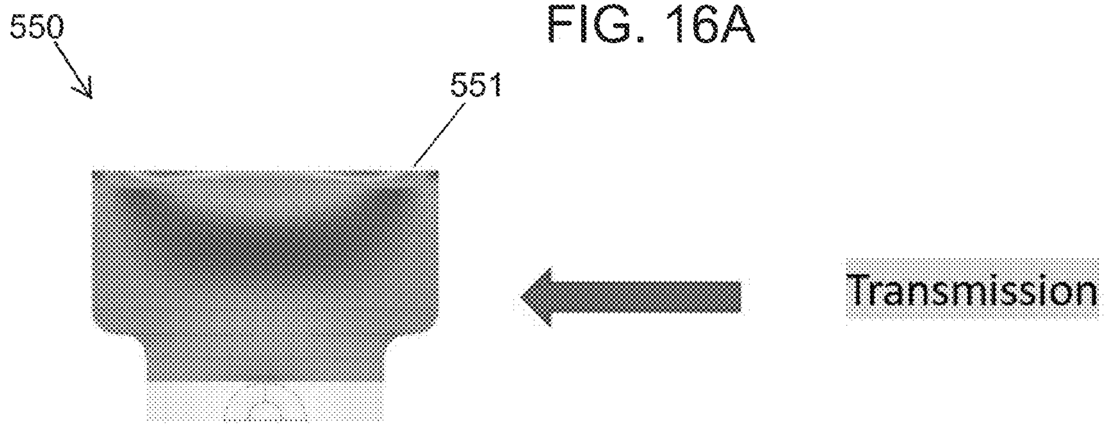

The inclusion of this feature optimizes performance of the device. The appropriate curvature and slab thickness the field distribution for one helicity peaks in the center and with the other helicity peaks on the sides, as can be seen in the electrical field images during operation of two different modes shown in FIGS. 15A-16B. At the same time the phase shift for the reflection from each helicity differs by 180 degrees. This can be achieved for both over and under resonance biases. In FIG. 15A, during operation of device 500' in isolation mode with port P2 being excited while port P4 is receiving, the disc of non-reciprocal material 551 has a maximum field (shown in red) along the center portion thereof, as shown in FIG. 15B. In FIG. 16A, during operation of device 500' in transmission mode with port P1 being excited while port P2 is receiving, the maximum field (shown in red) along the disc of non-reciprocal material 551 is offset and forms a circle surrounding the center of the disc, as shown in FIG. 16B.

Having described several exemplary configurations, various modifications, alternative constructions, and equivalents can be used without departing from the spirit of the disclosure. The above elements can be components of a larger system, wherein other rules can take precedence over or modify the application of the invention. Accordingly, the above description does not bound the scope of the claims. All patents, patent applications, and other publications cited in this application are incorporated by reference in their entirety for all purposes.

What is claimed is:

1. A multi-port waveguide, comprising:

a rectangular waveguide extending along an x-y plane between a first end and a second end opposite the first end, wherein the rectangular waveguide has opposing broad walls and opposite side walls, the rectangular waveguide having a first port and a second port disposed at or near the first end, wherein each of the first port and second port are single moded;

a first circular waveguide extending from a first broad wall of the rectangular waveguide to a third port, the first circular waveguide supporting at least two TE modes; and a second circular waveguide extending from a second broad wall opposite the first broad wall, the second circular waveguide supporting at least two TE modes.

2. The multi-port waveguide of claim 1, wherein the waveguide is designed to satisfy the following scattering(S) matrix:

$$S_{6\times 6} = \begin{pmatrix} e^{ie1} & 0 & 0 & 0 & 0 & 0 \\ 0 & e^{ie1} & 0 & 0 & 0 & 0 \\ 0 & 0 & e^{ie2} & 0 & 0 & 0 \\ 0 & 0 & 0 & e^{ie2} & 0 & 0 \\ 0 & 0 & 0 & 0 & e^{ie2} & 0 \\ 0 & 0 & 0 & 0 & 0 & e^{ie2} \end{pmatrix} \cdot \begin{pmatrix} 0 & \beta & \alpha & 0 & \alpha & 0 \\ \beta & 0 & 0 & \alpha & 0 & \alpha \\ \alpha & 0 & 0 & \gamma & 0 & \delta \\ 0 & \alpha & \gamma & 0 & \delta & 0 \\ \alpha & 0 & 0 & \delta & 0 & \gamma \\ 0 & \alpha & \delta & 0 & \gamma & 0 \end{pmatrix} \cdot \begin{pmatrix} e^{ie1} & 0 & 0 & 0 & 0 & 0 \\ 0 & e^{ie1} & 0 & 0 & 0 & 0 \\ 0 & 0 & e^{ie2} & 0 & 0 & 0 \\ 0 & 0 & 0 & e^{ie2} & 0 & 0 \\ 0 & 0 & 0 & 0 & e^{ie2} & 0 \\ 0 & 0 & 0 & 0 & 0 & e^{ie2} \end{pmatrix}.$$

3. The multi-port waveguide of claim 1 wherein the first port and second ports are each rectangular waveguide ports.

4. The multi-port waveguide of claim 3 wherein the multi-port waveguide is configured as an isolator between the first port and second port.

5. The multi-port waveguide of claim 4 wherein the third port is shorted.

6. The multi-port waveguide of claim 5 wherein the second circular waveguide comprises a shorting structure disposed along the second circular waveguide in a z-axis direction at a location at which a magnetic field on a ferrite of the shorting structure is minimized at full transmission through the second circular waveguide.

7. The multi-port waveguide of claim 1 wherein the waveguide is symmetrical about a y-z plane.

8. The multi-port waveguide of claim 7 wherein the waveguide comprises a Y-shaped or T-shaped structure having a base extending along a y-axis direction and first and second top arms at the first end extending in an x-axis direction, wherein the first and second top arms terminate in the first port and second ports, respectively.

9. The multi-port waveguide of claim 8 wherein the rectangular waveguide comprises a septum extending along the y-axis direction of the rectangular waveguide between the first and second ports.

10. The multi-port waveguide of claim 9 wherein the rectangular waveguide comprises a V-shaped portion extending inwardly to the septum between the first and second ports.

11. The multi-port waveguide of claim 9 wherein the rectangular waveguide comprises a stepped portion between the base and each of the first and second top arms.

12. The multi-port waveguide of claim 11 wherein each broad wall of the rectangular waveguide includes a partially domed surface around a base of the respective circular waveguide extending therefrom.

13. The multi-port waveguide of claim 12 wherein the second end of the rectangular waveguide is closed and includes a distal end surface.

14. The multi-port waveguide of claim 13 wherein the distal end surface of the second end angles or curves inwardly in the y-axis direction.

15. The multi-port waveguide of claim 14 wherein the distal end surface has two corner edges extending along a z-axis direction, wherein the two corner edges are curved.

16. The multi-port waveguide of claim 14 wherein the stepped portions, the partially domed surfaces and the distal end surface are dimensioned to satisfy the following scattering matrix:

$$S_{6\times 6} = \begin{pmatrix} e^{ie1} & 0 & 0 & 0 & 0 & 0 \\ 0 & e^{ie1} & 0 & 0 & 0 & 0 \\ 0 & 0 & e^{ie2} & 0 & 0 & 0 \\ 0 & 0 & 0 & e^{ie2} & 0 & 0 \\ 0 & 0 & 0 & 0 & e^{ie2} & 0 \\ 0 & 0 & 0 & 0 & 0 & e^{ie2} \end{pmatrix} \cdot \begin{pmatrix} 0 & \beta & \alpha & 0 & \alpha & 0 \\ \beta & 0 & 0 & \alpha & 0 & \alpha \\ \alpha & 0 & 0 & \gamma & 0 & \delta \\ 0 & \alpha & \gamma & 0 & \delta & 0 \\ \alpha & 0 & 0 & \delta & 0 & \gamma \\ 0 & \alpha & \delta & 0 & \gamma & 0 \end{pmatrix} \cdot \begin{pmatrix} e^{ie1} & 0 & 0 & 0 & 0 & 0 \\ 0 & e^{ie1} & 0 & 0 & 0 & 0 \\ 0 & 0 & e^{ie2} & 0 & 0 & 0 \\ 0 & 0 & 0 & e^{ie2} & 0 & 0 \\ 0 & 0 & 0 & 0 & e^{ie2} & 0 \\ 0 & 0 & 0 & 0 & 0 & e^{ie2} \end{pmatrix}.$$

17. The multi-port waveguide of claim 16 wherein $\alpha$ is $\frac{2}{3}$ and $\beta$ is $-\frac{1}{3}$ for the optimized case.

18. The multi-port waveguide of claim 1 further comprising one or more additional multi-port waveguides as in claim 1 stacked therewith such that the first circular waveguide of one multi-port waveguide is coupled with a second circular waveguide of an adjacent multi-port waveguide.

19. The multi-port waveguide of claim 1 wherein the waveguide is configured as a directional coupler.

20. The multi-port waveguide of claim 19 wherein the direction coupler includes:

a first multi-port waveguide as in claim 1, and a second multi-port waveguide as in claim 1.

21. The multi-port waveguide of claim 20 wherein the first circular waveguide of the first multi-port waveguide is coupled to the second circular waveguide of the second multi-port waveguide with a choking structure disposed therein for differential nominal coupling rates therethrough.

22. The multi-port waveguide of claim 21 wherein the first circular waveguide of the second multi-port waveguide comprises a shorting structure disposed on a plunger that is adjustable within the first circular waveguide such that the directional coupler is tunable by adjustment of the plunger.

23. A four-port isolator comprising:

a first multi-port waveguide as in claim 1 having first and second rectangular waveguide ports and first and second circular waveguides extending therefrom, and a second multi-port waveguide as in claim 1 having first and second rectangular waveguide ports and first and second circular waveguides extending therefrom;

wherein the first circular waveguide of the first multi-port waveguide is coupled to the second circular waveguide of the second multi-port waveguide.

24. The four-port isolator of claim 23, wherein the first circular waveguide of the second multi-port waveguide is shorted with a shorting structure located at a distance corresponding to a desired power capacity.

25. The four-port isolator of claim 23, wherein the first circular waveguide of the second multi-port waveguide includes a short and an adjustable biasing structure, optionally the short includes a non-reciprocal material of a garnet or a ferrite, and the biasing structure comprises a permanent magnet with an adjustable distance or a powered electromagnet having an adjustable field strength.

26. A multi-port waveguide, comprising:

a rectangular waveguide extending along an x-y plane between a first end and a second end opposite the first end, wherein the rectangular waveguide has opposing broad walls and opposite side walls, wherein the rectangular waveguide has a first port and a second port disposed at or near the first end, wherein each of the first port and second port are single moded, wherein the rectangular waveguide has a third port and a fourth port disposed at or near the second end, wherein each of the third port and fourth port are single moded; and a first circular waveguide extending from a first broad wall of the rectangular waveguide to a fifth port supporting at least two TE modes such that the multi-port waveguide can function as a six port polarizer.

27. The multi-port waveguide of claim 26, wherein a short circuit in the circular waveguide fifth port forms a four-port network designed to satisfy the following scattering matrix:

$$S_4 = \begin{pmatrix} 0 & \frac{1}{2}(1-e^{i\phi}) & \frac{1}{2}(1+e^{i\phi}) & 0 \\ \frac{1}{2}(1-e^{i\phi}) & 0 & 0 & \frac{1}{2}(1+e^{i\phi}) \\ \frac{1}{2}(1+e^{i\phi}) & 0 & 0 & \frac{1}{2}(1-e^{i\phi}) \\ 0 & \frac{1}{2}(1+e^{i\phi}) & \frac{1}{2}(1-e^{i\phi}) & 0 \end{pmatrix}.$$

28. The multi-port waveguide of claim 26, wherein the fifth port includes a short provided by a short circuit plate at a terminal end thereof.

29. The multi-port waveguide of claim 28, further comprising:

a circular disc of non-reciprocal material disposed atop the short, wherein a top surface of the non-reciprocal material is contoured inward toward the short circuit plate to optimize operation and distribution of fields along the circular disc in differing modes.

* * * * *